(12) United States Patent  
Shao et al.

(10) Patent No.: US 11,805,239 B2
(45) Date of Patent: Oct. 31, 2023

(54) ROTARY DISPLAY DEVICE AND CONTROL METHOD THEREFOR, AND ROTARY DISPLAY SYSTEM

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Jiyang Shao, Beijing (CN); Yuxin Bi, Beijing (CN); Binhua Sun, Beijing (CN); Feng Zi, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 50 days.

(21) Appl. No.: 17/765,333

(22) PCT Filed: Jan. 21, 2021

(86) PCT No.: PCT/CN2021/073147
§ 371 (c)(1),
(2) Date: Mar. 30, 2022

(87) PCT Pub. No.: WO2021/147964
PCT Pub. Date: Jul. 29, 2021

(65) Prior Publication Data
US 2022/0377314 A1 Nov. 24, 2022

(30) Foreign Application Priority Data
Jan. 22, 2020 (CN) .......................... 202010075120.3

(51) Int. Cl.
H04N 13/393 (2018.01)
H04N 13/398 (2018.01)

(52) U.S. Cl.
CPC ......... *H04N 13/393* (2018.05); *H04N 13/398* (2018.05)

(58) Field of Classification Search
CPC .... H04N 13/393; H04N 13/398; H04N 23/60; G09F 9/00; G09G 5/393
(Continued)

(56) References Cited

U.S. PATENT DOCUMENTS 4,160,973 A * 7/1979 Berlin, Jr. ............ H04N 13/393
345/82
7,961,182 B2 * 6/2011 Tachi ..................... G03B 35/18
348/42
(Continued)

FOREIGN PATENT DOCUMENTS

CN 102096197 A 6/2011
CN 103413502 A 11/2013
(Continued)

OTHER PUBLICATIONS

The First Office Action for the Chinese Patent Application No. 202010075120.3 issued by the Chinese Patent Office dated May 20, 2021.
(Continued)

Primary Examiner — Tung T Vo
(74) Attorney, Agent, or Firm — IP & T GROUP LLP

(57) ABSTRACT

A rotary display device includes a display module, a rotating shaft, a transmission apparatus, an acquisition apparatus and a control apparatus. The transmission apparatus is configured to drive the display module to rotate with the rotating shaft. The control apparatus is configured to: receive information of picture(s), acquired by the acquisition apparatus,
(Continued)

of an outside of the display module and determine whether a picture includes face figure(s); if no face figure is included in the picture, control the display module to display images in a first condition; if the face figure(s) are included in the picture, control the display module to display images in a second condition. A second refresh rate in the second condition is greater than a first refresh rate in the first condition, and a second color depth in the second condition is greater than a first color depth in the first condition.

20 Claims, 18 Drawing Sheets

(58) Field of Classification Search
USPC .......................................................... 348/51
See application file for complete search history.

(56) References Cited

U.S. PATENT DOCUMENTS

| | | | | |
|---|---|---|---|---|
| 9,158,189 | B2* | 10/2015 | Joseph | G03B 21/604 |
| 10,036,918 | B2* | 7/2018 | Lee | G02F 1/133602 |
| 10,827,166 | B2* | 11/2020 | Mall | G02B 30/27 |
| 11,402,657 | B2* | 8/2022 | Ohyama | H04N 13/32 |
| 2002/0001030 | A1* | 1/2002 | Kuiseko | H04N 13/324 |
| | | | | 348/51 |
| 2002/0008678 | A1* | 1/2002 | Rutherford | G09G 3/2935 |
| | | | | 345/60 |
| 2008/0043014 | A1* | 2/2008 | Tachi | G02B 30/54 |
| | | | | 348/E13.056 |
| 2008/0218854 | A1* | 9/2008 | Hoshino | H04N 13/302 |
| | | | | 359/462 |
| 2009/0303313 | A1* | 12/2009 | Yukich | H04N 13/393 |
| | | | | 348/51 |
| 2012/0092093 | A1* | 4/2012 | Sakurai | G02B 30/54 |
| | | | | 333/256 |
| 2012/0293632 | A1* | 11/2012 | Yukich | H04N 23/90 |
| | | | | 348/47 |
| 2018/0084166 | A1 | 3/2018 | Tachikawa | |
| 2019/0378444 | A1 | 12/2019 | Hsu et al. | |
| 2020/0137376 | A1* | 4/2020 | Deng | H04N 13/307 |
| 2021/0099653 | A1 | 4/2021 | Gao | |
| 2021/0356739 | A1* | 11/2021 | Yano | H04N 13/395 |
| 2021/0400253 | A1 | 12/2021 | Sun et al. | |

FOREIGN PATENT DOCUMENTS

| | | |
|---|---|---|
| CN | 104122985 A | 10/2014 |
| CN | 204129532 U | 1/2015 |
| CN | 104575283 A | 4/2015 |
| CN | 204650348 U | 9/2015 |
| CN | 105786093 A | 7/2016 |
| CN | 206021380 U | 3/2017 |
| CN | 206058811 U | 3/2017 |
| CN | 206209499 U | 5/2017 |
| CN | 107038986 A | 8/2017 |
| CN | 107643886 A | 1/2018 |
| CN | 108391100 A | 8/2018 |
| CN | 108737642 A | 11/2018 |
| CN | 109087593 A | 12/2018 |
| CN | 109493821 A | 3/2019 |
| CN | 109885176 A | 6/2019 |
| CN | 208954547 U | 6/2019 |
| CN | 110264905 A | 9/2019 |
| CN | 110515213 A | 11/2019 |
| CN | 209587551 U | 11/2019 |
| CN | 110545346 A | 12/2019 |
| CN | 110602369 A | 12/2019 |
| CN | 111261027 A | 6/2020 |
| EP | 2333753 A2 | 6/2011 |
| EP | 3926614 A1 | 12/2021 |
| JP | 2003-250074 A | 9/2003 |
| JP | 2010-259017 A | 11/2010 |

OTHER PUBLICATIONS

The Second Office Action for the Chinese Patent Application No. 202010075120.3 issued by the Chinese Patent Office dated Dec. 13, 2021.
Notification to Grant Patent Right for Invention for the Chinese Patent Application No. 202010075120.3 issued by the Chinese Patent Office dated Apr. 7, 2022.

* cited by examiner

ROTARY DISPLAY DEVICE AND CONTROL METHOD THEREFOR, AND ROTARY DISPLAY SYSTEM

CROSS-REFERENCE TO RELATED APPLICATIONS

This application is a national phase entry under 35 USC 371 of International Patent Application No. PCT/CN2021/073147, filed on Jan. 21, 2021, which claims priority to Chinese Patent Application No. 202010075120.3, filed on Jan. 22, 2020, which are incorporated herein by reference in their entirety.

TECHNICAL FIELD

The present disclosure relates to the field of display technologies, and in particular, to a rotary display device and a control method therefor, and a rotary display system.

BACKGROUND

A display panel of a rotary display device may rotate at a preset speed. When the display panel rotates to a preset position, a corresponding two-dimensional image will be displayed, and users may observe a stereoscopic image by utilizing a principle of visual residue.

SUMMARY

In an aspect, a rotary display device is provided. The rotary display device includes a display module, a rotating shaft, a transmission apparatus, an acquisition apparatus and a control apparatus. The rotating shaft is coupled to a side face of the display module. The transmission apparatus is coupled to the display module. The control apparatus is coupled to the acquisition apparatus.

The acquisition apparatus is configured to acquire at least one picture of an outside of the display module. The transmission apparatus is configured to drive the display module to rotate with an axial center line of the rotating shaft as an axis of rotation. The acquisition apparatus is further configured to send information of the at least one picture to the control apparatus. The control apparatus is configured to: receive the information of the at least one picture sent by the acquisition apparatus and determine whether a picture includes at least one face figure according to information of the picture; in response to determining that no face figure is included in the picture, control the display module to display images in a first condition, and in response to determining that the picture includes the at least one face figure, determine a main display space in a sweep space formed by rotation of the display module for a round according to at least one position of the at least one face figure in the picture, and control the display module to display images in a second condition when the display module rotates to the main display space.

The first condition includes at least one of a first refresh rate and a first color depth, and the second condition includes at least one of a second refresh rate and a second color depth. The second refresh rate is greater than the first refresh rate, and the second color depth is greater than the first color depth.

In some embodiments, the control apparatus includes a first controller and a second controller. The first controller is coupled to the acquisition apparatus, and the second controller is coupled to: the first controller and the display module. The first controller is configured to receive the information of the at least one picture sent by the acquisition apparatus and determine whether the picture includes the at least one face figure according to the information of the picture; and determine the main display space according to the at least one position of the at least one face figure in the picture in response to determining that the picture includes the at least one face figure.

The first controller is further configured to: send a first instruction to the second controller in response to determining that no face figure is included in the picture; and send a second instruction to the second controller in response to determining that the picture includes the at least one face figure. The second controller is configured to: receive the first instruction and control, in response to the first instruction, the display module to display the images in the first condition; and receive the second instruction and control, in response to the second instruction, the display module to display the images in the second condition in the main display space.

In some embodiments, the second controller is fixedly connected to display module.

In some embodiments, the rotary display device further includes a connecting plate. The second controller and the display module are fixed to the connecting plate.

In some embodiments, the rotating shaft and the transmission apparatus are respectively located on opposite sides of the display module in a direction of the axis of rotation of the display module.

In some embodiments, the rotary display device further includes a base. In the direction of the axis of rotation of the display module, the base is located on a side of the transmission apparatus away from the display module. The first controller is disposed on the base.

In some embodiments, the first controller is further configured to determine a non-main display space other than the main display space in the sweep space according to the at least one position of the at least one face figure in the picture in response to determining that the picture includes the at least one face figure.

The first controller is further configured to send a third instruction to the second controller according to the determined non-main display space. The second controller is further configured to control the display module to display the images in the first condition in the non-main display space according to the third instruction.

In some embodiments, the acquisition apparatus includes at least one camera disposed on the base.

In some embodiments, the display module includes a plurality of display panels tiled together.

In some embodiments, the transmission apparatus includes an output shaft and a motor. The output shaft is coupled to the display module. The motor is coupled to the output shaft. The motor is configured to drive the display module to rotate through the output shaft.

In some embodiments, the rotary display device further includes a first power supply component and at least one second power supply component. The first power supply component is coupled to the transmission apparatus. The at least one second power supply component is coupled to the first power supply component and the control apparatus. The first power supply component is configured to supply electric energy to the transmission apparatus. The first power supply component is further configured to supply electric energy to the at least one second power supply component. Each second power supply component is configured to transmit the electric energy from the first power supply component to the control apparatus.

In some embodiments, a second power supply component includes a first conductive ring and a second conductive ring. The first conductive ring is coupled to the first power supply component, and the second conductive ring is coupled to the control apparatus. Both the first conductive ring and the second conductive ring are sleeved on the output shaft.

In some embodiments, the first conductive ring is in contact with the second conductive ring.

In some other embodiments, the first conductive ring is provided with a power transmitting coil therein, the second conductive ring is provided with a power receiving coil therein, and the first conductive ring and the second conductive ring are arranged at an interval in an axial direction of the output shaft.

In another aspect, a rotary display system is provided. The rotary display system includes the rotary display device as described in any of the above embodiments and an upper computer. The upper computer is coupled to the rotary display device. The upper computer is configured to provide data of images to the rotary display device.

In yet another aspect, a control method for the rotary display device as described in any of the above embodiments is provided. The control method includes: receiving the information of the at least one picture of the outside of the display module acquired by the acquisition apparatus; determining whether the picture includes the at least one face figure according to the information of the picture; controlling the display module to display the images in the first condition during rotation in response to determining that no face figure is included in the picture; determining the main display space in the sweep space formed by the rotation of the display module for the round according to the at least one position of the at least one face figure in the picture in response to determining that the picture includes the at least one face figure; and controlling the display module to display the images in the second condition when the display module rotates to the main display space.

The first condition includes at least one of the first refresh rate and the first color depth, and the second condition includes at least one of the second refresh rate and the second color depth. The second refresh rate is greater than the first refresh rate, and the second color depth is greater than the first color depth.

In some embodiments, determining the main display space in the sweep space formed by the rotation of the display module for the round according to the at least one position of the at least one face figure in the picture, includes: determining a sub-region to which the at least one face figure belongs in the picture according to the at least one position of the at least one face figure in the picture; obtaining a first position and a second position of the sub-region mapped onto a peripheral border of the sweep space; obtaining to a first rotation angle and a second rotation angle, in a process in which the display module rotates for a round from an initial position, the first rotation angle being an included angle between the first position to which the display module rotates and the initial position, and the second rotation angle being an included angle between the second position to which the display module rotates and the initial position, the second rotation angle being greater than the first rotation angle; and determining the main display space according to a space formed by rotation of the display module from the first rotation angle to the second rotation angle.

In some embodiments, determining the main display space in the sweep space formed by the rotation of the display module for the round according to the at least one position of the at least one face figure in the picture, includes: determining sub-regions to which face figures belong in the picture according to positions of the face figures in the picture; mapping each sub-region onto the peripheral border of the sweep space, so as to obtain a first position and a second position of each sub-region mapped onto the peripheral border of the sweep space, and to obtain a first rotation angle and a second rotation angle respectively corresponding to the first position and the second position of each sub-region, in a process in which the display module rotates for the round from an initial position, the first rotation angle corresponding to the first position of each sub-region being an included angle between the first position of each sub-region to which the display module rotates and the initial position, and the second rotation angle corresponding to the second position of each sub-region being an included angle between the second position of each sub-region to which the display module rotates and the initial position, and the second rotation angle being greater than the first rotation angle; and determining the main display space according to a space formed by rotation of the display module from a smallest first rotation angle in first rotation angle to a largest second rotation angle in second rotation angles.

In some embodiments, the display module displays K frames of images during the rotation for the round, and K is a positive integer. Controlling the display module to display the images in the second condition when the display module rotates to the main display space, includes: obtaining an M-th frame of image displayed by the display module at the first position and an N-th frame of image displayed by the display module at the second position according to the first position and the second position, N being greater than M, M and N being both positive integers, and N being less than or equal to K; and transmitting data of Q frames of images from the M-th frame of image to the N-th frame of image to the display module to control the display module to display the Q frames of images in the second condition at Q positions corresponding to the main display space, Q being equal to a sum of 1 and a difference between N and M (Q=N−M+1).

In some embodiments, the display module displays K frames of images during the rotation for the round, and K is a positive integer.

In some embodiments, controlling the display module to display the images in the first condition during the rotation in response to determining that no face figure is included in the picture, includes: transmitting data of part of frames of images in the K frames of images to the display module, so that the display module displays the part of frames of images in the K frames of images.

In some other embodiments, controlling the display module to display the images in the first condition during the rotation in response to determining that the picture does not include the face figure, includes: adjusting color depths corresponding to the K frames of images to the first color depth and transmitting data of the adjusted K frames of images to the display module, so that color depths of the images displayed by the display module are the first color depth.

In yet some other embodiments, controlling the display module to display the images in the first condition during the rotation in response to determining that the picture does not include the face figure, includes: adjusting color depths corresponding to part of frames of images in the K frames of images to the first color depth and transmitting data of the adjusted part of frames of images in the K frames of images to the display module, so that the display module displays the adjusted part of frames of images in the K frames of images, and the color depths of the displayed images are the first color depth.

In some embodiments, the control method further includes: determining a non-main display space other than the main display space in the sweep space according to the at least one position of the at least one face figure in the picture in response to determining that the picture includes the at least one face figure; and controlling the display module to display images in the first condition in the non-main display space.

In some embodiments, the display module displays K frames of images during the rotation for the round, and K is a positive integer; R frames of images in the K frames of images correspond to the non-main display space, and R is a positive integer less than K.

In some embodiments, controlling the display module to display the images in the first condition in the non-main display space, includes: transmitting data of part of frames of images in the R frames of images to the display module, so that the display module sequentially displays the part of frames of images in the R frames of images in the non-main display space.

In some other embodiments, controlling the display module to display the images in the first condition in the non-main display space, includes: adjusting color depths corresponding to the R frames of images to the first color depth, and transmitting data of the adjusted R frames of images to the display module, so that the display module sequentially displays the adjusted R frames of images in the non-main display space, color depths of the displayed images being the first color depth.

In yet some other embodiments, controlling the display module to display the images in the first condition in the non-main display space, includes: adjusting color depths corresponding to part of frames of images in the R frames of images to the first color depth, and transmitting data of the adjusted part of the frames of images in the R frames of images to the display module, so that the display module sequentially displays the adjusted part of frames of images in the R frames of images in the non-main display space, the color depths of the displayed images being the first color depth.

In yet another aspect, a non-transitory computer-readable storage medium is provided. The computer-readable storage medium has stored thereon computer program instructions that, when run on a processor, cause the processor to perform one or more steps of the control method according to any of the above embodiments.

In yet another aspect, a computer program product is provided. The computer program product includes computer program instructions that, when run on a computer, cause the computer to perform one or more steps of the control method as described in any of the above embodiments.

In yet another aspect, a computer program is provided. When the computer program is run on a computer, the computer program causes the computer to perform one or more steps of the control method as described in any of the above embodiments.

BRIEF DESCRIPTION OF THE DRAWINGS

In order to describe technical solutions in the present disclosure more clearly, accompanying drawings to be used in some embodiments of the present disclosure will be introduced briefly below. However, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, and are not limitations on an actual size of a product, an actual process of a method and an actual timing of a signal involved in the embodiments of the present disclosure.

DETAILED DESCRIPTION

Figure 1A:
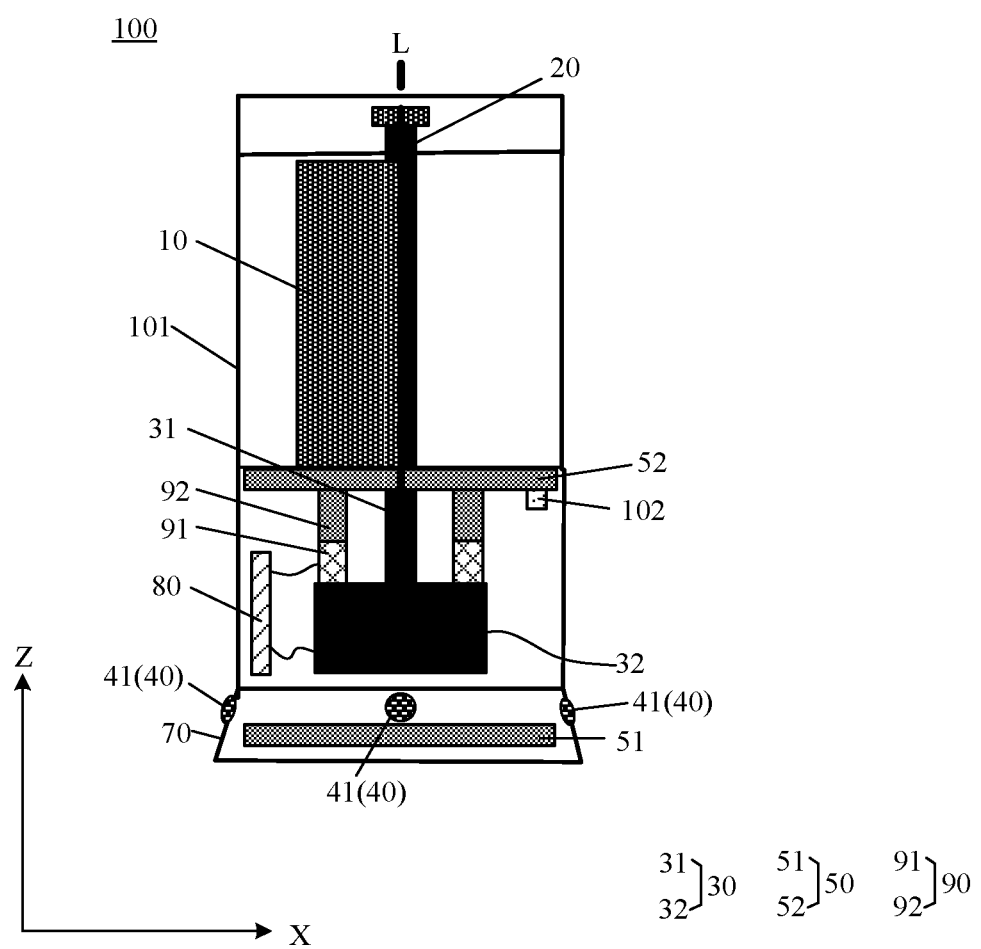
FIG. 1A is a structural diagram of a rotary display device, in accordance with some embodiments.

Technical solutions in some embodiments of the present disclosure will be described clearly and completely with reference to the accompanying drawings below. However, the described embodiments are merely some but not all embodiments of the present disclosure. All other embodiments obtained based on the embodiments of the present disclosure by a person of ordinary skill in the art shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

A person skilled in the art will understand that steps, measures and solutions in various operations, methods and processes that have been discussed in the present disclosure may be alternated, modified, combined or deleted. Further, other steps, measures and solutions in various operations, methods and processes that have been discussed in the present disclosure may also be alternated, modified, rearranged, decomposed, combined or deleted. Furthermore, the steps, measures and solutions in various operations, methods and processes that are disclosed in the present disclosure in the prior art may also be alternated, modified, rearranged, decomposed, combined or deleted.

In the description of the present disclosure, it will be understood that orientations or positional relationships indicated by terms "center", "upper", "lower", "front", "back", "left", "right", "vertical", "horizontal", "top", "bottom", "inner", "outer", etc. are based on orientations or positional relationships shown in the accompanying drawings, which are merely to facilitate and simplify the description of the present disclosure, and are not to indicate or imply that the referred devices or elements must have a particular orientation, or must be constructed and operated in a particular orientation. Therefore, they should not be construed as limitations to the present disclosure.

Below, the terms such as "first" and "second" are used for descriptive purposes only, and are not to be construed as indicating or implying relative importance or implicitly indicating the number of indicated technical features. Thus, a feature defined with "first" or "second" may explicitly or implicitly include one or more of the features. In the description of the embodiments of the present disclosure, the term "a plurality of/the plurality of" means two or more unless otherwise specified.

In the description of some embodiments, the terms such as "coupled" and "connected" and derivatives thereof may be used. For example, the term "connected" may be used in the description of some embodiments to indicate that two or more components are in direct physical contact or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the content herein. The terms "installed", "connected" and "connection" should be understood in a broad sense. For example, it may be a fixed connection, a detachable connection, or an integral connection; it may be a direct connection, an indirect connection through an intermediate medium, or an internal connection between two elements. Specific meanings of the above terms in the present disclosure may be understood by those skilled in the art according to specific situations.

As used herein, the term "if" is optionally construed as "when" or "in a case where" or "in response to determining that" or "in response to detecting", depending on the context. Similarly, the phrase "if it is determined that" or "if [a stated condition or event] is detected" is optionally construed as "in a case where it is determined that" or "in response to determining that" or "in a case where [the stated condition or event] is detected" or "in response to detecting [the stated condition or event]", depending on the context.

The phrase "applicable to" or "configured to" used herein has an open and inclusive meaning, which does not exclude devices that are applicable to or configured to perform additional tasks or steps.

In addition, the phrase "based on" used herein has an open and inclusive meaning, since a process, step, calculation or other action that is "based on" one or more of the stated conditions or values may, in practice, be based on additional conditions or values exceeding those stated.

As used herein, terms such as "about" or "approximately" include a stated value and an average value within an acceptable range of deviation of a particular value. The acceptable range of deviation is determined by a person of ordinary skill in the art in view of the measurement in question and the error associated with the measurement of a particular quantity (i.e., the limitations of the measurement system).

In the description of the specification, the specific features, structures, materials or characteristics may be combined in any one or more embodiments or examples in a suitable manner.

It will be understood that although steps in a flow diagram of the accompanying drawings are shown in sequence as indicated by the arrows, these steps are not necessarily performed in sequence in the order indicated by the arrows. Unless explicitly stated herein, these steps are executed in no strict order, and may be executed in other orders. Moreover, at least some of the steps in the flow diagram of the accompanying to drawings may include a plurality of sub-steps or a plurality of phases, and these sub-steps or phases are not necessarily executed at a same time, but may be executed at different times. The order of execution is not necessarily sequential, but may be performed in turn or alternately with other steps or at least some of the sub-steps or phases of other steps.

In order to improve a display effect, a rotary display device needs to have a high refresh rate (generally several thousand Hz or tens of thousands Hz). Accordingly, the rotary display device needs to process a large amount of data. However, due to a limited data processing capability of the rotary display device, it is difficult for the rotary display device to process a relatively large amount of data, resulting in that the rotary display device cannot display images at a relatively high refresh rate.

Figure 1B:
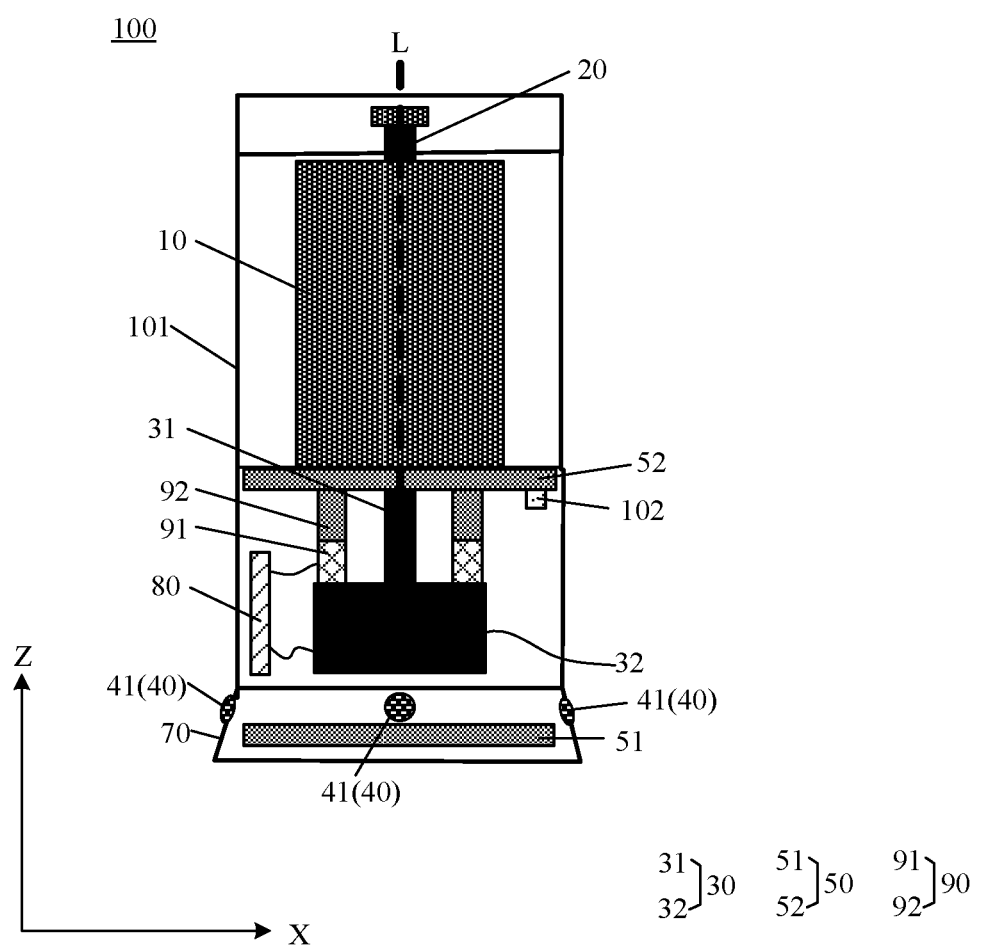
FIG. 1B is a structural diagram of another rotary display device, in accordance with some embodiments.

Embodiments of the present disclosure provide a rotary display device. As shown in FIGS. 1A and 1B, the rotary display device 100 includes a display module 10, a rotating shaft 20, a transmission apparatus 30, an acquisition apparatus 40 and a control apparatus 50. The rotating shaft 20 is coupled to a side face of the display module 10. For example, the side face may be any surface other than a display surface of the display module and a surface parallel to the display surface of the display module. The transmission apparatus 30 is coupled to the display module 10. The control apparatus 50 is coupled to the acquisition apparatus 40.

Figure 2A:
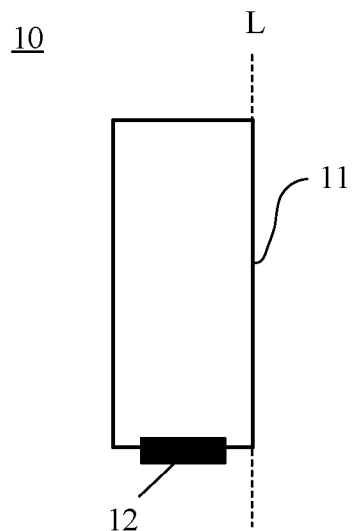
FIG. 2A is a structural diagram of a display module, in accordance with some embodiments.
Figure 2B:
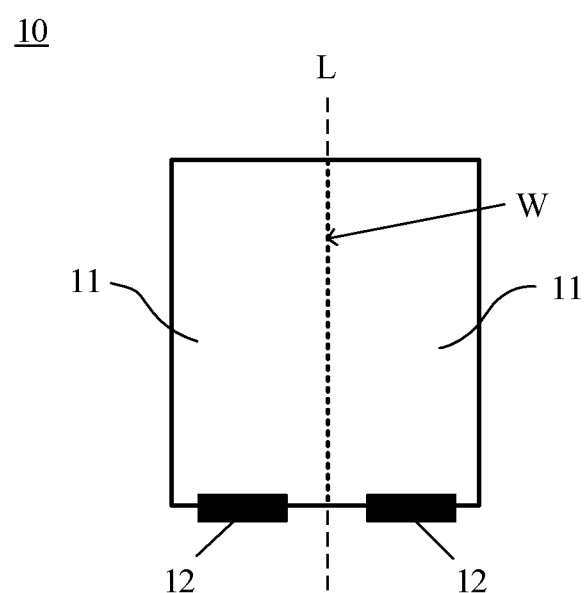
FIG. 2B is a structural diagram of another display module, in accordance with some embodiments.

For example, as shown in FIGS. 2A and 2B, the display module 10 includes display panel(s) 11. For example, the display panel may include a liquid crystal display (LCD) panel; or the display panel may include a self-luminous display panel, such as a display panel based on organic light-emitting diodes (OLEDs), or a display panel based on light-emitting diodes (LEDs), etc. For example, in a case where the display panel is to the LCD panel, the display module further includes a backlight module.

It will be noted that the specific number of display panels in the display module may be designed according to actual situations, which is not limited herein. For example, referring to FIG. 2A, the number of display panels 11 may be one. For example, an axis of rotation of the display module may overlap or approximately overlap with an edge of the display panel. For example, the edge of the display panel is parallel to a column direction in which pixels are arranged in the display panel. For example, the axis of rotation of the display module may be parallel to the column direction in which the pixels are arranged in the display panel. It will be understood that, in a process in which the display module rotates for a round, the pixels in the display panel of the display module rotate for a round in space correspondingly, and a space body formed by displaying includes spatial pixels, i.e., voxels.

For example, as shown in FIG. 2B, the display module 10 includes a plurality of display panels 11. The plurality of display panels 11 are tiled together. In this way, the plurality of display panels 11 are of an integrated structure. For example, there are at least two display panels. That is, the number of display panels may be two, four or six. For example, in the tiled display panels, a range of an included angle between two adjacent display panels (i.e., display surfaces of the display panels) is greater than 0° and less than or equal to 180°. For example, the included angle between the two adjacent display panels may be 45°, 90°, 120° or 180°. For example, referring to FIG. 2B, the number of display panels 11 is two, and the included angle between the two display panels 11 tiled together is 180°. For example, referring to FIG. 2B, edges (or boundaries) W, which are tiled to each other, of the plurality of display panels overlaps or approximately overlaps with the axis of rotation of the display module. For example, the axis of rotation of the display module overlaps or approximately overlaps with edges, which are tiled to each other, of the two display panels.

For example, the plurality of display panels in the display module may surround the rotating shaft in a circumferential direction of the rotating shaft. For example, the plurality of display panels in the display module may surround an axial center line (or an axis of rotation) of the rotating shaft in a clockwise or counterclockwise direction.

The transmission apparatus is configured to drive the display module to rotate with the axial center line of the rotating shaft as the axis of rotation. For example, an axial direction of the rotating shaft may be the Z direction in FIGS. 1A and 1B. The acquisition apparatus is configured to acquire picture(s) of an outside of the display module. The acquisition apparatus is further configured to send information of the picture(s) to the control apparatus.

The control apparatus is configured to: receive the information of the picture(s) sent by the acquisition apparatus and determine whether a picture includes face figure(s) according to information of the picture; in response to determining that no face figure is included in the picture, control the display module to display images in a first condition; and in response to determining that the picture includes the face figure(s), determine a main display space in a sweep space formed by rotation of the display module for a round according to position(s) of the face figure(s) in the picture, and control the display module to display images in a second condition when the display module rotates to the main display space.

The first condition includes at least one of a first refresh rate and a first color depth, and the second condition includes at least one of a second refresh rate and a second color depth. The second refresh rate is greater than the first refresh rate, and the second color depth is greater than the first color depth. For example, specific values of the first refresh rate, the first color depth, the second refresh rate and the second color depth may be set according to actual situations, which are not limited here. For example, the first refresh rate is 60 Hz and the second refresh rate is 90 Hz; or the first refresh rate may be half of the second refresh rate, and the first refresh rate is 60 Hz and the second refresh rate is 120 Hz. For example, the first color depth is 6 bits, and the second color depth is 8 bits.

Figure 3:
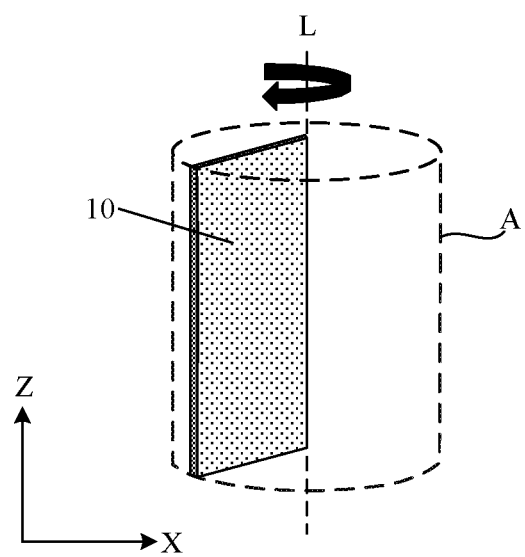
FIG. 3 is a schematic diagram of a sweep space of a display module, in accordance with some embodiments.

For example, referring to FIG. 3, column A represents the sweep space formed by rotation of the display module 10 for a round. For example, a space swept by display surface(s) of the display panel(s) in the display module during rotation for a round is the sweep space. For example, the outside of the display module 10 may be understood as a space other than the sweep space, e.g., a space other than column A in FIG. 3. For example, outside the display module, if a distance between a position where a person is located and the axis of rotation is within a preset range, it may be considered that the person is located within an effective use region of the rotary display device, and then the person may be regarded as a user of the rotary display device. That is, the person located within the effective use region of the rotary display device may be regarded as the user of the rotary display device. The preset range may be set according to actual situations, which is not limited here. For example, the preset range may be greater than or equal to 0.2 meters and less than or equal to 10 meters. That is, a region where a distance between the user and the axis of rotation is 0.2 meters to 10 meters may be used as the effective use region of the rotary display device.

Figure 4:
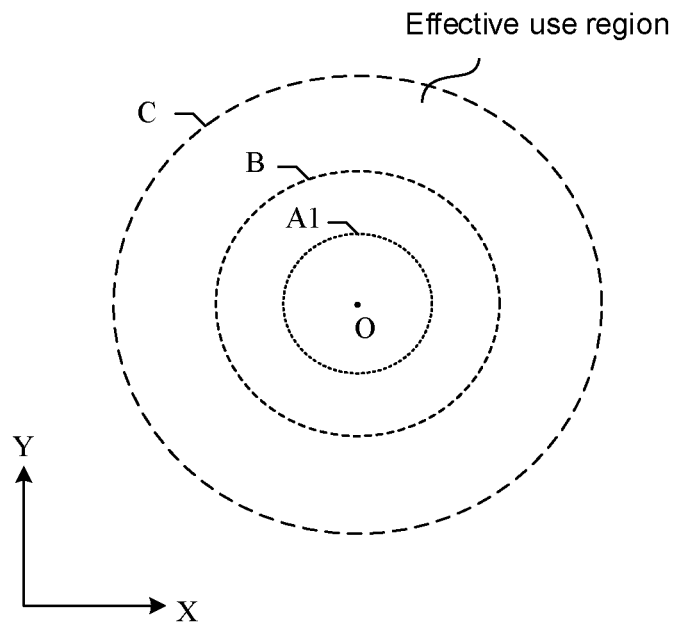
FIG. 4 is a schematic diagram of an effective use region, in accordance with some embodiments.

For example, referring to FIG. 4, a border of circle A1 may represent a peripheral border of the sweep space of the display module, and a center of circle A1 may represent a position of the axis of rotation; and geometric centers (or geometric centers of gravity, or centers) of circle A1, circle B and circle C coincide. For example, figures enclosed by borders of circle A1, circle B and circle C may be circular or approximately circular, or may be elliptical or approximately elliptical. A region between the border of circle B and the border of circle C may be regarded as the effective use region of the rotary display device. For example, a radius of circle B is 0.2 meters, and a radius of circle C is 10 meters. For example, a position of point O in FIG. 4 may be understood as a position of an orthographic projection of the axis of rotation on a plane where the rotary display device is placed (e.g., a plane formed by the X direction and the Y direction in FIG. 4), and the border of circle A1 may be understood as a border of an orthogonal projection of the peripheral border of the sweep space of the display module on the plane where the rotary display device is placed.

Figure 5:
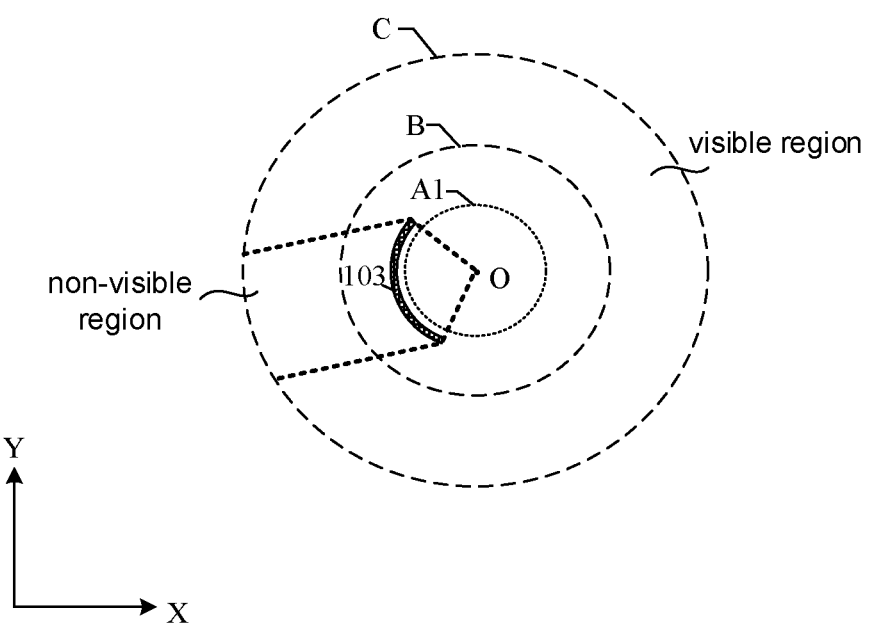
FIG. 5 is a schematic diagram of a visible region and a non-visible region, in accordance with some embodiments.

For example, referring to FIG. 4, there is no obstruction (e.g., non-transparent protective shell) capable of blocking the user's view in a region between the border of circle A1 and the border of circle C, so that the user may see the display module at any position within the effective use region. For example, referring to FIG. 5, there is an obstruction (e.g., a non-transparent protective shell) capable of blocking the user's view in the region between the border of circle A1 and the border of circle C, such as an obstruction 103 in FIG. 5. In this way, due to the obstruction, the effective use region may be divided into a visible region and a non-visible region, and the user can see the display module at any position within the visible region; when the user is in the non-visible region, the user cannot see the display module due to the obstruction.

Figure 6A:
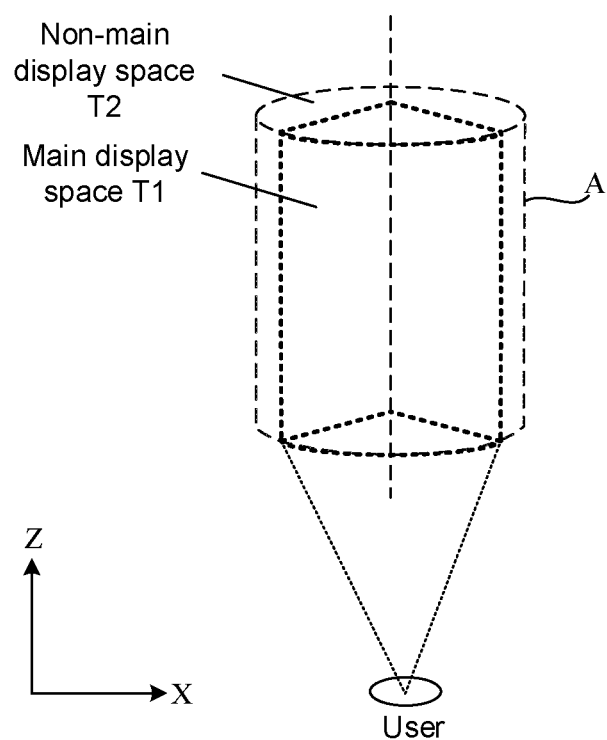
FIG. 6A is a schematic diagram of a main display space and a non-main display space, in accordance with some embodiments.
Figure 6B:
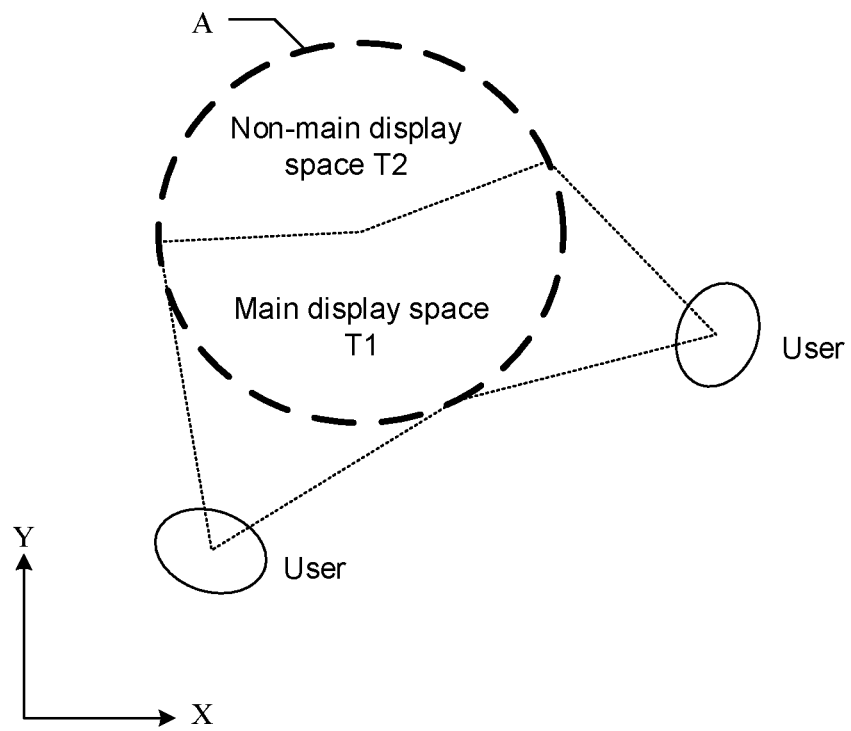
FIG. 6B is another schematic diagram of a main display space and a non-main display space, in accordance with some embodiments.

For example, determining the main display space and a non-main display space is to divide the sweep space of the display module according to the user's viewing range. For example, FIGS. 6A and 6B show examples of division of the main display space and the non-main display space. FIG. 6A is a three-dimensional schematic diagram showing a main display space T1 and a non-main display space T2 into which a sweep space A is divided; and FIG. 6B is a schematic plan view showing a main display space T1 and a non-main display space T2 into which a sweep space A is divided on the plane where the rotary display device is placed (e.g., the plane formed by the X direction and the Y direction in FIG. 6B).

It will be understood that, in a case where the picture includes the face figure(s), it may be considered that there are user(s) viewing the display module in a space outside the display module; the main display space may represent a space formed by positions where the display module is viewed by the user(s) during the rotation of the display module, and the non-main display space may represent a space formed by positions where the display module is not viewed by the user(s) during the rotation of the display module.

Therefore, in the rotary display device provided in the embodiments of the present disclosure, the acquisition apparatus and the control apparatus are used to determine whether there are user(s) viewing the display module and determine the main display space in the sweep space of the display module that the user(s) are capable of viewing. During a process in which the display module is viewed by the user(s), the display module is controlled by the control apparatus to display images in the second condition in the main display space, so that the images displayed by the display module satisfy a condition of normal display to ensure the display effect and provide a good viewing experience for the user. During a process in which the display module is not viewed by the user(s), the display module is controlled by the control apparatus to display images in the first condition, the first condition being lower than the condition of normal display of the display module. In this way, an amount of data required to be processed by the control apparatus may be reduced, and a workload of the control apparatus may be reduced, thereby reducing the power consumption of the rotary display device and improving the performance of the rotary display device.

In addition, the rotary display device may dynamically adjust the refresh rate and color depth as required. As a result, on a premise of not affecting the user's viewing experience, the rotary display device may not only perform display at a high refresh rate to ensure the display effect, but also does not add too much workload to the control apparatus. This provides a feasible condition for a miniaturization and high voxel design of the rotary display device.

In some embodiments, as shown in FIGS. 1A and 1B, the control apparatus 50 includes a first controller 51 and a second controller 52.

The first controller 51 is coupled to the acquisition apparatus 40. The second controller 52 is coupled to the first controller 51 and the display module 10. For example, the first controller and the second controller may both be processors, and the processors may be arranged on circuit board(s). For example, the first controller is arranged on a circuit board, and the second controller is arranged on another circuit board. For example, the second controller may be coupled to the display module through a flexible printed circuit (FPC).

For example, the second controller and the first controller may be wirelessly connected such that wireless communication is realized between the second controller and the first controller. For example, both the first controller and the second controller are internally configured with Bluetooth, and the first controller and the second controller communicate through Bluetooth.

The first controller is configured to: receive the information of the picture(s) sent by the acquisition apparatus, and determine whether the picture includes the face figure(s) according to the information of the picture; and determine the main display space according to the position(s) of the face figure(s) in the picture in response to determining that the picture includes the face figure(s).

The first controller is further configured to: send a first instruction to the second controller in response to determining that no face figure is included in the picture; and send a second instruction to the second controller in response to determining that the picture includes the face figure(s).

The second controller is configured to: receive the first instruction and control, in response to the first instruction, the display module to display images in the first condition; and receive the second instruction and control, in response to the second instruction, the display module to display images in the second condition in the main display space.

Figure 7:
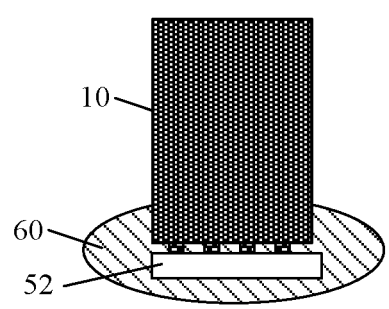
FIG. 7 is a structural diagram of yet another rotary display device, in accordance with some embodiments.

In some embodiments, the second controller 52 is fixedly connected to the display module 10. There is no relative movement between the second controller and the display module. During the rotation of the display module, the second controller rotates with the rotation of the display module. For example, a rotation speed of the display module is the same as a rotation speed of the second controller. For example, referring to FIG. 7, the rotary display device 100 further includes a connecting plate 60. The second controller 52 and the display module 10 are fixed to the connecting plate 60. For example, slot(s) are provided on the connecting plate, and the second controller and the display module are each fixed to the connecting plate through the slot(s). For example, a circuit is further provided on the connecting plate, so that the second controller and the display module that are fixed to the connecting plate may communicate through the circuit. For example, the connecting plate is a circuit board, such as a printed circuit board (PCB).

In some embodiments, referring to FIG. 1B, in a direction of the axis L of rotation of the display module 10, the rotating shaft 20 and the transmission apparatus 30 are respectively located on opposite sides of the display module 10. For example, in a direction perpendicular to the plane where the rotary display device is normally placed (e.g., in the Z direction in FIG. 1B), the transmission apparatus 30 is farther away from the rotating shaft 20 than the display module 10.

In some embodiments, as shown in FIGS. 1A and 1B, the rotary display device 100 further includes a base 70. In the direction of the axis L of rotation of the display module 10, the base 70 is located on a side of the transmission apparatus 30 away from the display module 10. The first controller 51 is disposed on the base 70. In this way, the first controller does not rotate. That is, the first controller is fixed during rotation of the second controller.

In some embodiments, the first controller is further configured to determine the non-main display space (referring to the non-main display space T2 in FIGS. 6A and 6B) other than the main display space in the sweep space according to the position(s) of the face figure(s) in the picture in response to determining that the picture includes the face figure(s). The first controller is further configured to send a third instruction to the second controller according to the determined non-main display space.

The second controller is further configured to control the display module to display images in the first condition in the non-main display space according to the third instruction.

In this case, the control apparatus (e.g., the first controller in the control apparatus) may also determine the non-main display space. When the display module rotates into the non-main display space that the user cannot view, the control apparatus (e.g., the second controller in the control apparatus) controls the display module to display the images in the first condition, so that the amount of data required to be processed by the control apparatus is reduced, and the workload of the control apparatus is reduced.

For example, the rotary display device may further include a memory, in which data of the displayed images may be stored. The data of the displayed images may be pre-stored in the memory by the staff, or may be obtained by the second controller from an external device (e.g., an upper computer in the following), i.e., sent (e.g., sent in real time or sent in advance) by the external device to the second controller. For example, the memory may be integrated inside the second controller; or the memory and the second controller may be arranged on a same circuit board.

For example, referring to FIGS. 1A and 1B, the acquisition apparatus 40 includes at least one camera 41. The at least one camera 41 is disposed on the base 70. For example, referring to FIGS. 1A and 1B, the at least one camera 41 is disposed on an outer surface of the base 70. For example, the acquisition apparatus includes a plurality of cameras, the first controller may be coupled to the plurality of cameras to receive pictures of the outside of the display module acquired by the plurality of cameras.

For example, the acquisition apparatus includes the plurality of cameras distributed around the axis of rotation of the display module, and a lens of each camera faces away from the axis of rotation. The specific number and positions of cameras may be designed according to actual situations, which are not limited here. For example, the specific number and positions of cameras are related to a range of a region that a camera may acquire (i.e., a shooting range of the camera) and a size of the effective use region. A range of regions that may be acquired by the plurality of cameras should cover the effective use region, and when the user is viewing the display module at any position in the effective use region, a camera may acquire the user's face figure.

In addition, in order to save costs and reduce the number of cameras, for example, no camera may be provided at a position corresponding to the non-main display space or the non-visible region. If a range of a region that may be acquired by one camera may cover the visible region or the effective use region, the lens of the camera is pointed to the visible region or the effective use region. If a range of regions that may be acquired by two or more cameras may cover the visible region or the effective use region, the two or more cameras may be arranged at intervals inside the visible region or the effective use region, and a lens of each camera is pointed to the visible region or the effective use region, so that it is ensured that the range of the regions acquired by the two or more cameras covers the visible region or the effective use region. When the user is viewing the display module at any position of the visible region or the effective use region, the camera may acquire the user's face figure.

In some embodiments, as shown in FIGS. 2A and 2B, the display module 10 further includes driving chip(s) 12. The driving chip(s) 12 are coupled to the display panel(s) 11. The driving chip(s) are configured to drive the display panel(s) 11 to perform display. For example, the driving chip may be a driver integrated circuit (IC). For example, there are a plurality of driving chips. For example, a display panel is coupled to a driving chip, and each driving chip drives a display panel to which the driving chip is coupled, so that a condition in which each display panel displays images will not be affected by other display panels. For example, conditions such as refresh rates used when different display panels display images and color depths of the displayed images may be different. Alternatively, there may be one driving chip, and the driving chip may drive the display panel(s) in the display module and uniformly control the display panel(s), thus simplifying a driving mode.

In some embodiments, as shown in FIGS. 1A and 1B, the transmission apparatus 30 includes an output shaft 31 and a motor 32. The output shaft 31 is coupled to the display module 10. The motor 32 is coupled to the output shaft 31. The motor is configured to drive the display module to rotate through the output shaft. For example, in a case where the rotary display device includes the base, the motor is disposed on the base.

For example, the output shaft and the rotating shaft are coaxially arranged. For example, an axial center line of the output shaft coincides with the axial center line of the rotating shaft. For example, the display module may rotate with the axial center line of the output shaft as the axis of rotation.

For example, in a case where the control apparatus includes the second controller, the output shaft is coupled to the second controller, and the motor is further configured to control the second controller to rotate through the output shaft. For example, an axis of rotation of the second controller is the same as the axis of rotation of the display module.

In some embodiments, referring to FIGS. 1A and 1B, the rotary display device 100 further includes a first power supply component 80 and at least one second power supply component 90.

The first power supply component 80 is coupled to the transmission apparatus 30. The at least one second power supply component 90 is each coupled to the first power supply component 80 and the control apparatus 50. The first power supply component is configured to supply electric energy to the transmission apparatus. The first power supply component is further configured to supply electric energy to the at least one second power supply component. Each second power supply component is configured to transmit the electric energy from the first power supply component to the control apparatus.

For example, the first power supply component may be a power supply device with a function of storing electric energy, such as a battery. The first power supply component transmits its own stored electric energy to the control apparatus (e.g., the second controller in the control apparatus) through the at least one second power supply component. The first power supply component may also be a power interface coupled to an external power source. The power interface transmits electric energy from the external power source to the at least one second power supply component, and the at least one second power supply component supplies electric energy to the control apparatus (e.g., the second controller in the control apparatus).

Figure 8:
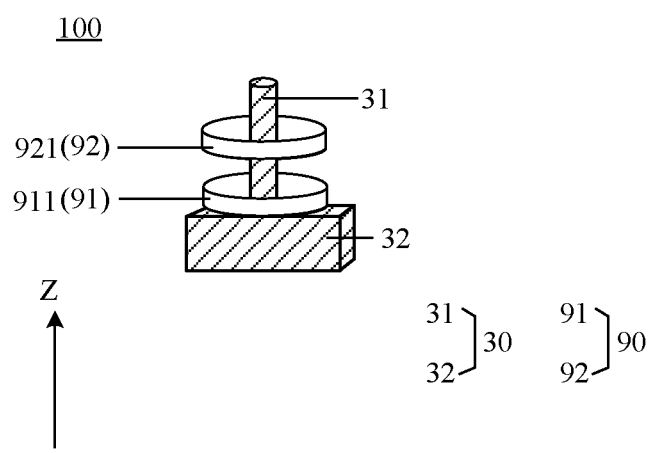
FIG. 8 is a structural diagram of yet another rotary display device, in accordance with some embodiments.

In some embodiments, referring to FIGS. 1A and 1B, the second power supply component 90 includes a first conductive ring 91 and a second conductive ring 92. The first conductive ring 91 is coupled to the first power supply component 80. The second conductive ring 92 is coupled to the control apparatus 50. For example, in the case where the control apparatus includes the second controller, the second conductive ring is coupled to the second controller in the control apparatus. Referring to FIG. 8, the first conductive ring 91 and the second conductive ring 92 are both sleeved on the output shaft 31. During rotation of the output shaft, for example, the first conductive ring is fixed (that is, the first conductive ring does not rotate), and the second conductive ring rotates with the output shaft. For example, a rotational speed of the second conductive ring is equal to or approximately equal to a rotational speed of the output shaft.

For example, the first conductive ring is in contact with the second conductive ring. Electric energy (e.g., a current) supplied by the first power supply component is transmitted to the control apparatus (e.g., the second controller in the control apparatus) through the first conductive ring and the second conductive ring in sequence, so as to supply power to the control apparatus.

For another example, referring to FIG. 8, the first conductive ring 91 is provided with power transmitting coil(s) 911 therein, the second conductive ring 92 is provided with power receiving coil(s) 921 therein, and the first conductive ring and the second conductive ring are arranged at an interval in an axial direction of the output shaft (e.g., the Z direction in FIG. 8). The electric energy (e.g., the current) supplied by the first power supply component may be transmitted to the power transmitting coil(s) in the first conductive ring. Due to an electromagnetic induction effect, a current may be induced in the power receiving coil(s) in the second conductive ring, and the second conductive ring may transmit the induced current to the control apparatus (e.g., the second controller in the control apparatus) to supply power to the control apparatus.

It will be noted that, those skilled in the art may understand that the first conductive ring and the second conductive ring in the above form may include other elements that perform specific processing on the current, and details will not be described here.

For example, the rotary display device further includes a control board. The first power supply component is disposed on the control board. For example, the control board may be a circuit board. For example, the control board includes a switch configured to control the on and off of the control apparatus. For example, the switch may control the on and off of the second controller in the control apparatus. For example, the switch may be a button. The user may control the on and off of the control apparatus through the switch.

For example, referring to FIGS. 1A and 1B, the rotary display device 100 further includes a housing 101. Both the control apparatus and the display module are located inside the housing. It will be understood by those skilled in the art that at least a portion of a region of the housing corresponding to the display module should be transparent.

It will be understood by those skilled in the art that the transmission apparatus may further include a decelerating component. For example, the decelerating component is a gearbox. The output shaft may also be coupled (e.g., drivingly connected) to the second controller in the control apparatus through the decelerating component, so that the output shaft may control the rotation of the second controller in the control apparatus through the decelerating component. For example, the output shaft may control the rotational speed of the second controller through the decelerating component. For example, a power input terminal of the decelerating component is coupled to the output shaft, and a power output terminal of the decelerating component is coupled to the control apparatus (e.g., the second controller in the control apparatus).

For example, referring to FIGS. 1A and 1B, the rotary display device 100 further includes a tachometer 102. The tachometer is configured to detect the rotational speed of the display module. For example, the tachometer may be disposed on the same circuit board (e.g., PCB) as the second controller.

In some other embodiments, the first controller and camera(s) may also be disposed at other positions on a premise that functions of the first controller and the camera(s) are not affected, and details will not be described here. For example, the rotary display device further includes a top plate. The top plate is disposed on a side of the display module away from the transmission apparatus in the direction of the axis of rotation of the display module, or in the direction of the axis of rotation, the base and the top plate are respectively located on opposite sides of the display module; and the first controller and the camera(s) may be disposed on the top plate.

Figure 9:
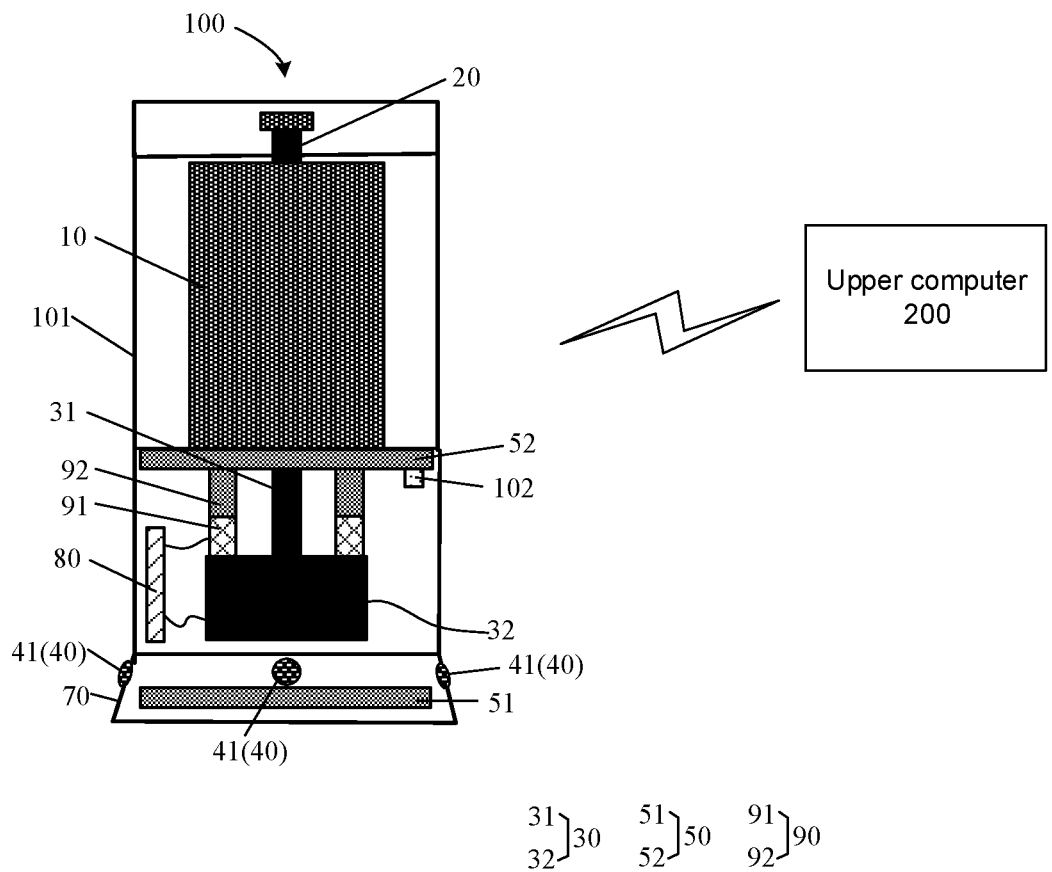
FIG. 9 is a structural diagram of a rotary display system, in accordance with some embodiments.

Embodiments of the present disclosure provide a rotary display system. The rotary display system includes a rotary display device and an upper computer. The rotary display device is the rotary display device described in any of the above embodiments. As shown in FIG. 9, the rotary display device 100 and the upper computer 200 in the rotary display system 300 are coupled to each other. The upper computer is configured to provide data of display images to the rotary display device.

For example, the upper computer may be a cloud server or any other electronic device with a function of transmitting data, such as a mobile phone, a tablet computer, a wearable device, an on-board device, an augmented reality (AR)/ virtual reality (VR) device, a laptop, an ultra-mobile personal computer (UMPC), a netbook, a personal digital assistant (PDA), etc., and the embodiments of the present disclosure will not limit the specific type of the upper computer.

For example, in the case where the control apparatus in the rotary display device includes the second controller, the upper computer is communicatively coupled to the second controller. For example, the upper computer and the second controller may communicate wirelessly. In this case, the upper computer transmits the data of the display images to the second controller.

It will be noted that beneficial effects of the rotary display system are the same as the beneficial effects of the rotary display device described in some of the above embodiments, and will not be repeated here.

Embodiments of the present disclosure provide a control method for a rotary display device. The rotary display device is the rotary display device as described in any of the above embodiments (e.g., the rotary display device 100 in FIG. 1A or 1B). For example, the control method described below is applicable to the rotary display device in any of the above embodiments. For example, the control apparatus in the rotary display device may implement the control method described below. For example, the first controller and the second controller in the control apparatus jointly implement the control method described below.

Figure 10:
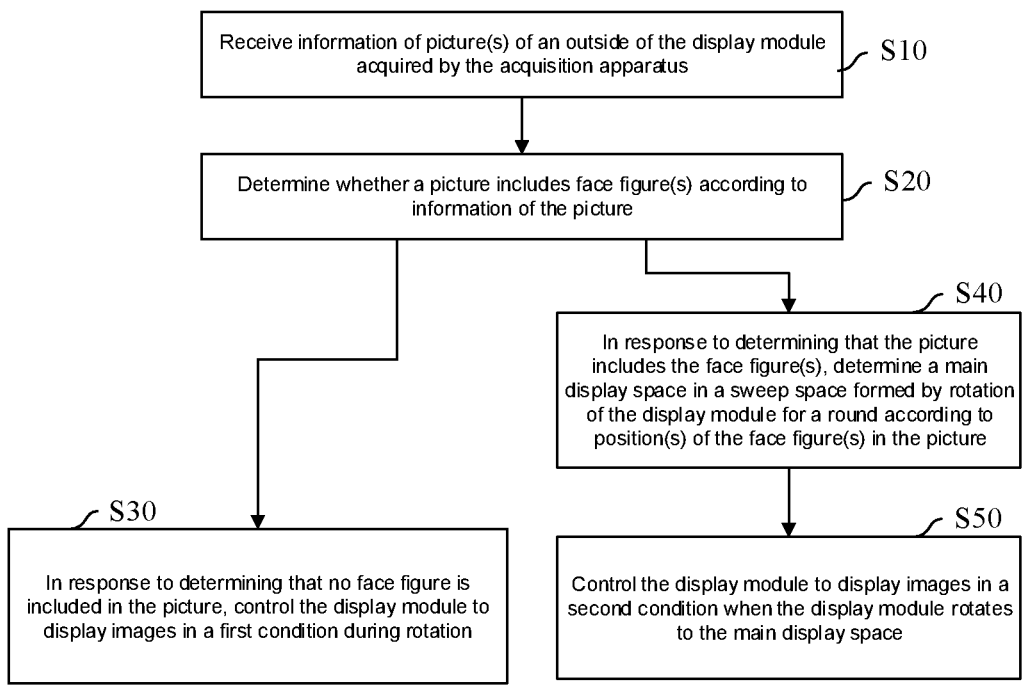
FIG. 10 is a flow diagram of a control method for a rotary display device, in accordance with some embodiments.

Referring to FIG. 10, the control method includes following steps (S10 to S50).

In S10, the information of the picture(s) of the outside of the display module acquired by the acquisition apparatus is received.

For example, the control apparatus 50 in FIGS. 1A and 1B may implement the S10. For example, the first controller 51 in the control apparatus 50 in FIGS. 1A and 1B may implement the S10. For example, the acquisition apparatus may be the acquisition apparatus 40 in FIGS. 1A and 1B. The acquisition apparatus acquires the picture(s) of the outside of the display module and sends the information of the picture(s) to the control apparatus (e.g., the first controller in the control apparatus).

In S20, it is determined whether the picture includes the face figure(s) according to the information of the picture.

For example, the control apparatus 50 in FIGS. 1A and 1B may implement the S20. For example, the first controller 51 in the control apparatus 50 in FIGS. 1A and 1B may be used to perform the S20.

In S30, in response to determining that no face figure is included in the picture, the display module is controlled to display images in the first condition during rotation.

For example, the control apparatus 50 in FIGS. 1A and 1B may implement the S30. For example, the second controller 52 in the control apparatus 50 in FIGS. 1A and 1B may be used to perform the S30.

It will be understood that, in a case where no face figure is included in the picture, there is no user viewing the display module. In this case, the display module may be controlled to perform display at each position in the first condition, which is lower than a condition in which the display module normally performs display. For example, in a process of displaying images in the first condition, the refresh rate of the display module is low, and the color depth of displayed images is low. In this way, the amount of data required to be processed by the rotary display device is reduced. That is, the amount of data required to be processed by the control apparatus is reduced, namely, the amount of data required to be processed by the second controller is reduced, thereby reducing the workload of the rotary display device.

For example, the display module displays K frames of images during rotation for a round, and K is a positive integer. For example, each frame of image is a two-dimensional image. Each frame of image is configured to be displayed by the display module when the display module rotates to a corresponding position on the peripheral border of the sweep space. For example, referring to FIG. 12, during the rotation of the display module for the round, the display module is at an initial position (i.e., a starting position) of the rotation when displaying a first frame of image. Since the initial position and an end position of the display module are the same position, the display module is at a previous position relative to the end position of the rotation when displaying a K-th frame of image. In addition, a range of corresponding voxels may be obtained according to a range of frames of images that are displayed during the rotation of the display module.

Figure 12:
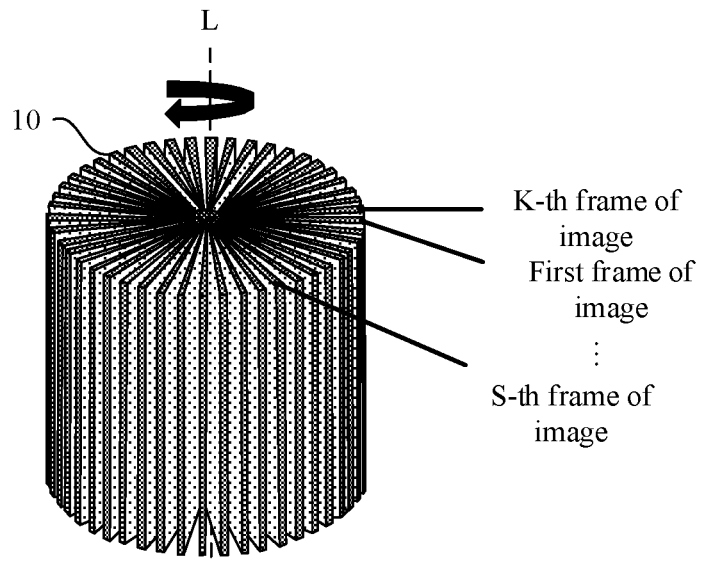
FIG. 12 is a schematic diagram of images displayed by a display module during rotation, in accordance with some embodiments.

For example, in a case where the rotational speed of the display module is uniform, if the display module normally performs display, e.g., performs display in a second condition (e.g., at a second refresh rate), the number of frames of images corresponding to the rotation of the display module for a round may be preset, and a position of the display module corresponding to the sweep space when the display module displays each frame of image is also preset. For example, in a case where the display module performs display at the second refresh rate, the display module may display K frames of images during rotation for a J-th round (J is a positive integer). Referring to FIG. 12, a position of the display module corresponding to the sweep space when the display module displays the first frame of image may be the initial position of the rotation of the display module, and a rotation angle of the display module at the initial position is 0 degree. In a case where K is equal to 360, the display module rotates by (S−1) degrees in a rotation direction (e.g., a clockwise direction) of the display module from the initial position to a position of the display module corresponding to the sweep space when the display module displays an S-th frame of image (S is a positive integer greater than 1). Color depths of the K frames of images that are displayed by the display module are the second color depth.

In this case, for example, controlling the display module to display images in the first condition during the rotation in response to determining that no face figure is included in the picture, includes: transmitting (or sending) data of part of frames of images in the K frames of images to the display module, so that the display module displays the part of frames of images in the K frames of images.

For example, during the rotation of the display module for the J-th round, the data of the part of frames of images in the K frames of images may be sent to the display module, and the number of the part of frames of images is less than the number of the K frames of images, so that images displayed by the display module are the part of frames of images in the K frames of images. For example, in a case where the number of the K frames of images is 360, and the number of the part of frames of images in the K frames of images is 180, data of the 180 frames of images in the 360 frames of images may be sent to the display module, so that the display module displays the 180 frames of images during the rotation for the J-th round. In this case, the refresh rate of the display module may be a first refresh rate, and the first refresh rate is lower than the second refresh rate. The first refresh rate may be half of the second refresh rate. For example, the part of frames of images in the K frames of images may be odd frames of images in the K frames of images, or even frames of images in the K frames of images. For example, the 180 frames of images may be odd frames of images in the 360 frames of images, or even frames of images in the 360 frames of images. In this case, by transmitting the data of the part of frames of images in the K frames of images to the display module, and not transmitting data of the other part of frames of images in the K frames of images to the display module, it is possible to reduce the amount of date of the images required to be processed by the display module during displaying.

For example, two or more frames of images in the K frames of images may be merged to obtain the part of frames of images in the K frames of images. For example, two adjacent frames of images are merged according to a preset algorithm to obtain a new frame of image. For example, 360 frames of images are converted into 180 frames of images through the preset algorithm, so that the display module displays the part of frames of images. In this way, it is possible to reduce the number of frames of images displayed by the display module during the rotation for a round, thereby reducing the amount of the data of the images required to be processed by the display module during displaying.

For another example, controlling the display module to display images in the first condition during the rotation in response to determining that no face figure is included in the picture, includes: adjusting color depths corresponding to the K frames of images to the first color depth, and transmitting data of the adjusted K frames of images to the display module, so that color depths of the images displayed by the display module are the first color depth.

For example, the display module adjusts the color depths of the K frames of images to the first color depth during the rotation for the J-th round. For example, the color depths of the K frames of images are reduced from a color depth of normal display (e.g., the second color depth) to the first color depth, and the data of the adjusted K frames of images are transmitted to the display module, so that the color depths of the K frames of images displayed by the display module are the first color depth. In this way, during the rotation of the display module for the J-th round, the color depth of the K frames of images displayed by the display module is lower, which reduces the amount of data required to be processed by the control apparatus, thereby reducing the power consumption of the rotary display device.

For yet another example, controlling the display module to display images in the first condition during the rotation in response to determining that no face figure is included in the picture, includes: adjusting color depths corresponding to part of frames of images in the K frames of images to the first color depth, and transmitting data of the adjusted part of frames of images in the K frames of images to the display module, so that the display module displays the adjusted part of frames of images in the K frames of images, the color depths of the images displayed by the display module being the first color depth.

For example, during the rotation of the display module for the J-th round, in the case where the number of the K frames of image is 360, and the number of the part of frames of images in the K frames of images is 180, color depths corresponding to the 180 frames of images may all be adjusted to the first color depth. For example, the color depths of the 180 frames of images are reduced from the color depth of normal display (e.g., the second color depth) to the first color depth, and data corresponding to the adjusted 180 frames of images are transmitted to the display module, so that the display module displays the adjusted 180 frames of images during the rotation for the J-th round, and color depths corresponding to the displayed 180 frames of images are all the first color depth. In this case, the refresh rate of the display module is the first refresh rate, and the first refresh rate is half of the second refresh rate. In this way, it is possible to reduce the number of frames of images displayed by the display module during the rotation for a round, thereby reducing the amount of data of the images required to be processed by the display module during displaying, and reducing the power consumption of the display module.

It will be understood by those skilled in the art that the second controller in the control apparatus transmits the data of the images to the driving chip(s) of the display module. The driving chip(s) drive display panel(s) in the display module to display the images according to the data of the images, and the images displayed by the display panel(s) may be two-dimensional images.

In S40, in response to determining that the picture includes the face figure(s), the main display space is determined in the sweep space formed by the rotation of the display module for a round according to the position(s) of the face figure(s) in the picture. For example, the control apparatus 50 in FIGS. 1A and 1B may implement the S40. For example, the second controller 52 in the control apparatus 50 in FIGS. 1A and 1B may be used to perform the S40.

For example, a positional relationship between the acquisition apparatus (e.g., each camera in the acquisition apparatus) and the sweep space of the display module is fixed, and thus a range of a region that may be acquired by a camera is also fixed. In a case where the user is within a region that may be acquired by the camera in the acquisition apparatus, a maximum range of a portion of the sweep space that the user is capable of seeing may also be determined.

Figure 13:
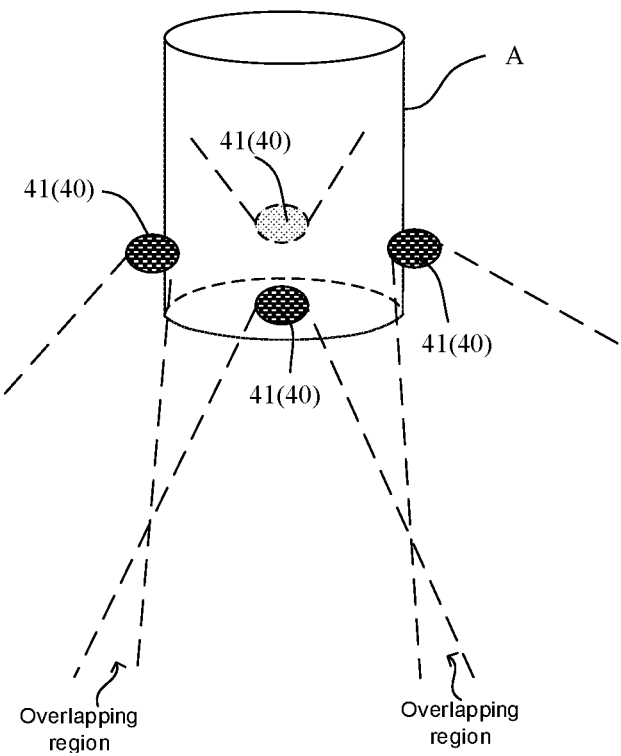
FIG. 13 is a schematic diagram of a range of a region that may be acquired by an acquisition apparatus, in accordance with some embodiments.
Figure 14:
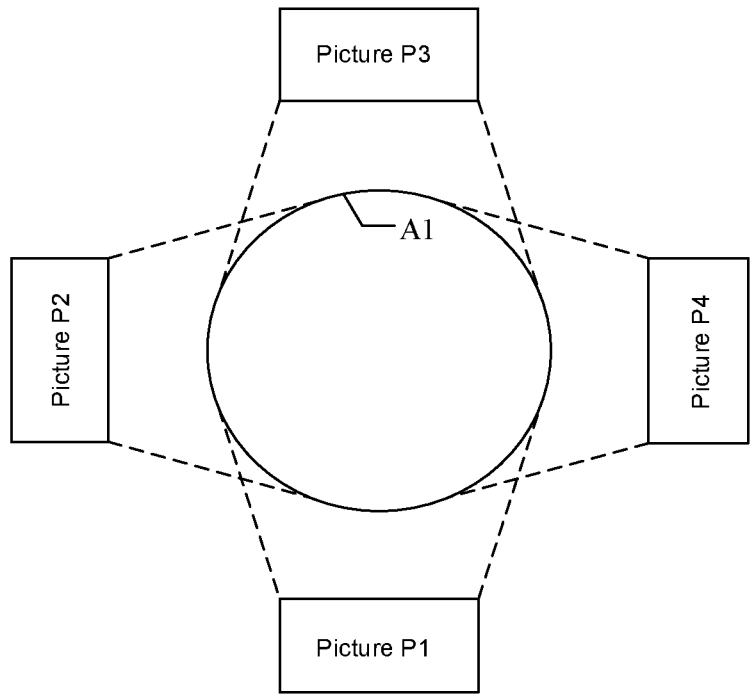
FIG. 14 is a schematic diagram of images acquired by the acquisition apparatus, in accordance with some embodiments.

For example, the picture(s) acquired by the acquisition apparatus may represent a range of a region that may be acquired by the acquisition apparatus. For example, referring to FIG. 13, the acquisition apparatus 40 in the rotary display device includes four cameras 41, and a column A may represent the sweep space of the display module. A range of a space defined by the column A in FIG. 13 is approximately the same as a range of a space defined by a circle A1 in FIG. 14, and two dashed lines drawn from each camera 41 in FIG. 13 represent a range of a region that may be acquired by a respective camera 41. For example, pictures of the outside of the display module that may be acquired by the four cameras 41 in FIG. 13 may be pictures P1, P2, P3, and P4 in FIG. 14. Referring to FIG. 14, a range defined in the sweep space by the two dashed lines drawn from an edge of each picture may represent the maximum range of the portion of the sweep space that the user is capable of seeing when the user is within a region that may be acquired by a camera acquiring the picture. For example, a camera takes the picture P1, and a range of the two dashed lines drawn from an edge of the picture P1 mapped onto the peripheral border of the sweep space represents the maximum range of the portion of the sweep space that the user is capable of seeing when the user is within the region that may be acquired by the camera.

For example, in a case where the user is within a region that may be acquired by a camera in the acquisition apparatus and the maximum range of the portion of the sweep space that the user is capable of seeing is determined, a range of a portion of the sweep space that the user is capable of seeing may also be determined according to a specific position of the user within the region that may be acquired by the camera. The position of the user's face figure in the picture may represent the position of the user within the region that may be acquired by the camera. According to the position of the face figure in the picture, the range of the portion of the sweep space that the user is capable of seeing at the current position may be determined, and the space seen by the user in the sweep space is the main display space.

For example, determining the main display space in the sweep space formed by the rotation of the display module for the round according to the position(s) of the face figure(s) in the picture, includes:

determining a sub-region to which the face figure(s) belong in the picture according to the position(s) of the face figure(s) in the picture;

obtaining a first position and a second position of the sub-region mapped onto the peripheral border of the sweep space;

obtaining a first rotation angle and a second rotation angle. In a process in which the display module rotates for a round from the initial position, the first rotation angle is an included angle between the first position to which the display module rotates and the initial position, and the second rotation angle is an included angle between the second position to which the display module rotates and the initial position. The second rotation angle is greater than the first rotation angle. In a case where the display module rotates for the round in the same rotation direction, the first position appears earlier than the second position; and determining the main display space according to a space formed by rotation of the display module from the first rotation angle to the second rotation angle.

Figure 15:
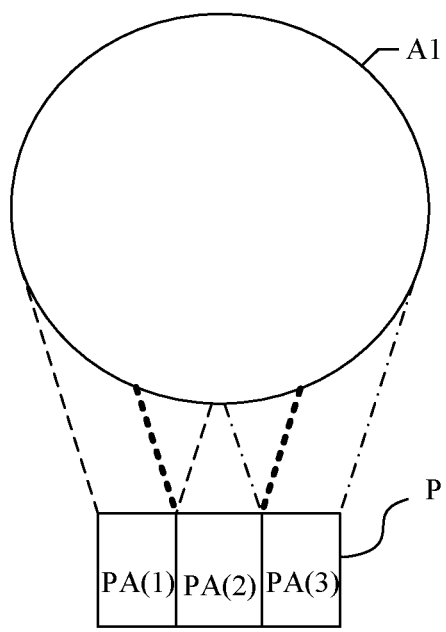
FIG. 15 is a process diagram of a control method for a rotary display device, in accordance with some embodiments.
Figure 16:
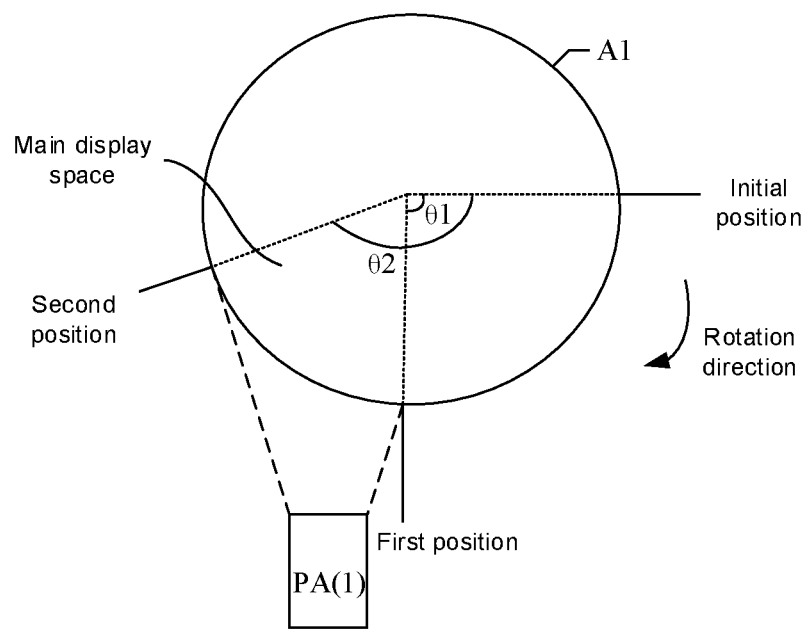
FIG. 16 is another process diagram of a control method for a rotary display device, in accordance with some embodiments.

For example, referring to FIG. 15, an acquired picture P of the outside of the display module may be divided into three sub-regions, and the three sub-regions are a sub-region PA(1), a sub-region PA(2) and a sub-region PA(3). A range defined in the sweep space by two dashed lines drawn from edges of each sub-region may represent a range between the first position and the second position of each sub-region mapped onto the peripheral border of the sweep space, and may also represent the maximum range of the portion of the sweep space that the user is capable of seeing when the user's face figure is in the sub-region. For example, when the user's face figure is in the sub-region PA(1), a range defined in the sweep space by two dashed lines drawn from edges of the sub-region PA(1) may represent the maximum range of the portion of the sweep space that the user is capable of seeing. For example, in a case where the rotation direction of the display module is clockwise, referring to FIG. 16, a position of a point where a dashed line drawn from a right edge of the sub-region PA(1) intersects the circle A1 may represent the first position of the sub-region PA(1) mapped onto the peripheral border of the sweep space, and a position of a point where a dashed line drawn by a left edge of the sub-region PA(1) intersects the circle A1 may represent the second position of the sub-region PA(1) mapped onto the peripheral border of the sweep space. That is, in a process in which the display module rotates for a round in the rotation direction, the display module first rotates to the first position and then rotates to the second position in the same rotation direction. In FIG. 16, θ1 represents the first rotation angle, i.e., the included angle between the first position at which the display module is located and the initial position; θ2 represents the second rotation angle, i.e., the included angle between the second position at which the display module is located and the initial position. In this case, a space formed by rotation of the display module from the first rotation angle θ1 to the second rotation angle θ2, i.e., a space formed by rotation of the display module from the first position to the second position, is determined as the main display space.

Figure 17A:
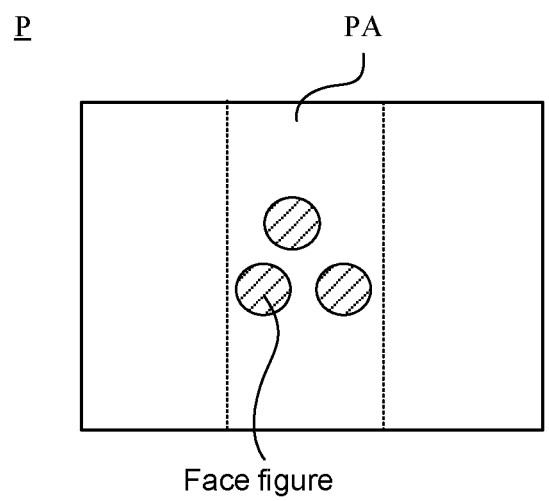
FIG. 17A is a schematic diagram of sub-regions in a picture, in accordance with some embodiments.
Figure 17B:
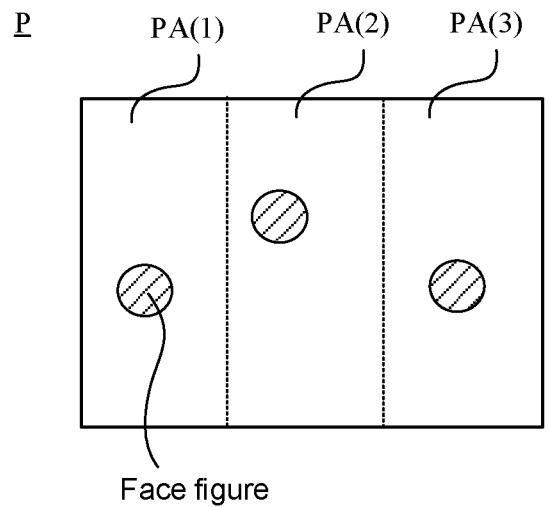
FIG. 17B is another schematic diagram of sub-regions in a picture, in accordance with some embodiments.
Figure 17C:
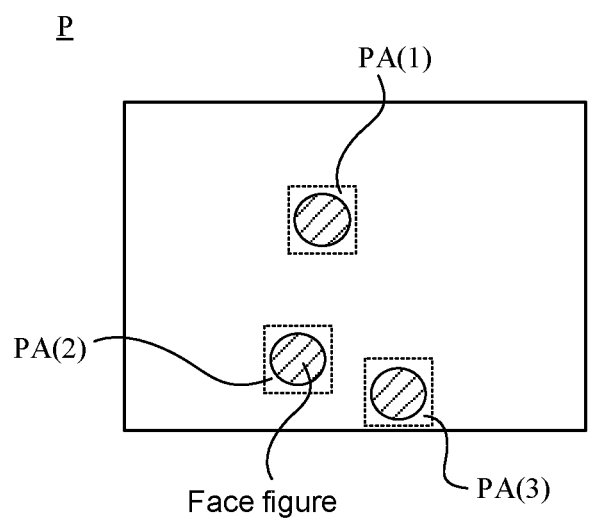
FIG. 17C is yet another schematic diagram of sub-regions in a picture, in accordance with some embodiments.

For example, in a case where the picture includes a plurality of face figures, the plurality of face figures may be sorted to different sub-regions according to actual situations. For example, the plurality of face figures may be sorted to a sub-region, and referring to FIG. 17A, the plurality of face figures in the picture P are all sorted to the sub-region PA. For example, each of the plurality of face figures may be sorted to a sub-region, and referring to FIGS. 17B and 17C, the plurality of face figures in the picture P are respectively sorted to a plurality of sub-regions, and the plurality of sub-regions are PA(1), PA(2) and PA(3). In addition, a range of each sub-region may be designed according to actual situations, and a range of each sub-region in FIG. 17B is larger than a range of each sub-region in FIG. 17C.

In some embodiments, determining the main display space in the sweep space formed by the rotation of the display module for the round according to the position(s) of the face figure(s) in the picture, includes:

determining sub-regions to which face figures belong in the picture according to positions of the face figures in the picture;

mapping each sub-region onto the peripheral border of the sweep space, so as to obtain a first position and a second position of each sub-region mapped onto the peripheral border of the sweep space, and to obtain a first rotation angle and a second rotation angle respectively corresponding to the first position and the second position of each sub-region; in a process in which the display module rotates for the round from the initial position, the first rotation angle corresponding to the first position of each sub-region being an included angle between the first position of each sub-region to which the display module rotates and the initial position, and the second rotation angle corresponding to the second position of each sub-region being an included angle between the second position of each sub-region to which the display module rotates and the initial position; and the second rotation angle being greater than the first rotation angle; and determining the main display space according to a space formed by rotation of the display module from a smallest first rotation angle in first rotation angles to a largest second rotation angle in second rotation angles.

Figure 18A:
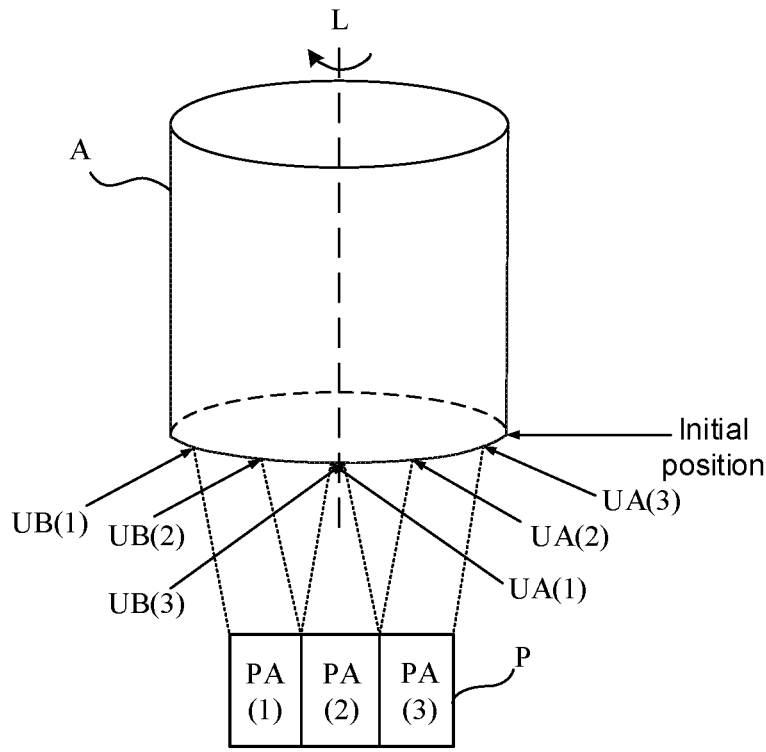
FIG. 18A is yet another process diagram of a control method for a rotary display device, in accordance with some embodiments.
Figure 18B:
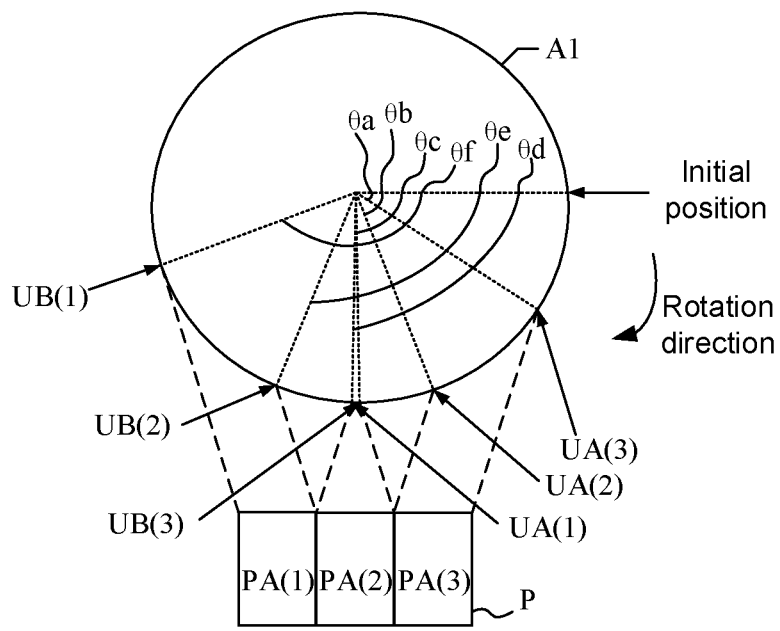
FIG. 18B is yet another process diagram of a control method for a rotary display device, in accordance with some embodiments.

For example, referring to FIG. 18A, a plurality of sub-regions are determined in the picture P, and the plurality of sub-regions are PA(1), PA(2) and PA(3). Each sub-region is mapped onto the peripheral border of the sweep space A to obtain the first position and the second position corresponding to each sub-region. For example, a first position corresponding to the sub-region PA(1) is UA(1), and a second position corresponding to the sub-region PA(1) is UB(1); a first position corresponding to the sub-region PA(2) is UA(2), and a second position corresponding to the sub-region PA(2) is UB(2); and a first position corresponding to the sub-region PA(3) is UA(3), and a second position corresponding to the sub-region PA(3) is UB(3). Referring to FIG. 18B, according to the fact that the first position corresponding to the sub-region PA(1) is UA(1) and the second position corresponding to the sub-region PA(1) is UB(1), a first rotation angle θd corresponding to the first position UA(1) of the sub-region PA(1) and a second rotation angle θf corresponding to the second position UB(1) of the sub-region PA(1) are obtained; according to the fact that the first position corresponding to the sub-region PA(2) is UA(2) and the second position corresponding to the sub-region PA(2) is UB(2), a first rotation angle θb corresponding to the first position UA(2) of the sub-region PA(2) and a second rotation angle θe corresponding to the second position UB(2) of the sub-region PA(2) are obtained; and according to the fact that the first position corresponding to the sub-region PA(3) is UA(3) and the second position corresponding to the sub-region PA(3) is UB(3), a first rotation angle θa corresponding to the first position UA(3) of the sub-region PA(3) and a second rotation angle θc corresponding to the second position UB(3) of the sub-region PA(3) are obtained. θa<θb<θc<θd<θe<θf, and thus the second rotation angle θf corresponding to the second position UB(1) of the sub-region PA(1) is the largest second rotation angle, and the first rotation angle θa corresponding to the first position UA(3) of the sub-region PA(3) is the smallest first rotation angle. Therefore, a space formed by rotation of the display module from the first rotation angle θa corresponding to the first position UA(3) of the sub-region PA(3) to the second rotation angle θf corresponding to the second position UB(1) of the sub-region PA(1) may be determined as the main display space. The first position UA(3) of the sub-region PA(3) may serve as a position of a border of the main display space, and the second position UB(1) of the sub-region PA(1) may serve as a position of another border of the main display space.

In S50, the display module is controlled to display images in the second condition when rotating to the main display space. For example, the control apparatus 50 in FIGS. 1A and 1B may implement the S50. For example, the second controller 52 in the control apparatus 50 in FIGS. 1A and 1B may be used to perform the S50.

The first condition includes at least one of the first refresh rate and the first color depth. The second condition includes at least one of the second refresh rate and the second color depth. The second refresh rate is greater than the first refresh rate, and the second color depth is greater than the first color depth.

For example, the second refresh rate is a refresh rate that the rotary display device has during normal display, i.e., a refresh rate desired by the rotary display device during normal display. The second color depth is a color depth that images have when the rotary display device normally displays the images, i.e., a color depth desired by the rotary display device during normal display. It will be understood that, during the rotation of the display module, if the display module displays images normally, the display module performs display in the second condition. For example, the refresh rate of the displayed images is the second refresh rate, and the color depth of the displayed images is the second color depth. When the display module rotates to a certain period of time or passes through a certain region, at least one of the refresh rate and the color depth of the display module may be reduced. For example, the second refresh rate is reduced and the reduced refresh rate serves as the first refresh rate, and the second color depth is reduced and the reduced color depth serves as the first color depth. The obtained first refresh rate is less than the second refresh rate, and the obtained first color depth is less than the second color depth. In this way, the amount of data required to be processed by the rotary display device may be reduced, and the power consumption of the rotary display device may be reduced. Specific values of the first refresh rate, the second refresh rate, the first color depth and the second color depth may be determined according to actual design requirements.

For example, the display module displays K frames of images during the rotation for a round, and K is a positive integer. Each frame of image is configured to be displayed by the display module when the display module rotates to a corresponding position on the peripheral border of the sweep space.

In this case, controlling the display module to display images in the second condition when the display module rotates to the main display space, includes:

obtaining an M-th frame of image displayed by the display module at the first position and an N-th frame of image displayed by the display module at the second position according to the first position and the second position, where N is greater than M, M and N are both positive integers, and N is less than or equal to K; and transmitting data of Q frames of images from the M-th frame of image to the N-th frame of image to the display module to control the display module to display the Q frames of images in the second condition at Q positions corresponding to the main display space, where Q is equal to a sum of 1 and a difference between N and M (Q=N−M+1).

Figure 19:
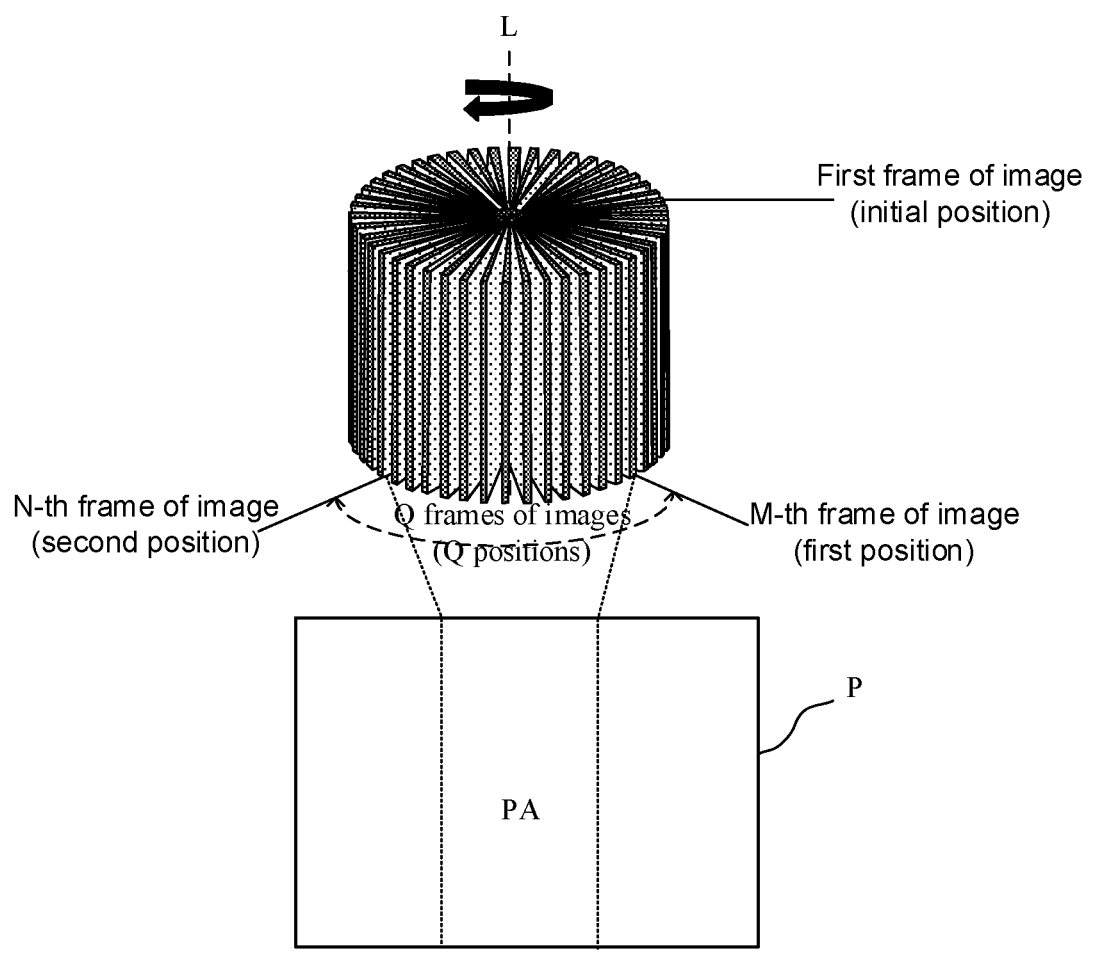
FIG. 19 is yet another process diagram of a control method for a rotary display device, in accordance with some embodiments.

For example, referring to FIG. 19, during the rotation of the display module, the display module respectively displays the M-th frame of image and the N-th frame of image when the display module rotates to the first position and the second position on the peripheral border of the sweep space corresponding to the sub-region PA in the picture P. Since the display module first rotates to the first position and then rotates to the second position in the rotation direction of the display module, the M-th frame of image is displayed first, and the N-th frame of image is displayed later. For example, the first position and the second position may serve as positions of borders of the main display space. The M-th frame of image and the N-th frame of image may serve as boundaries of a range of frames of images correspondingly displayed by the display module in the main display space. That is, the frames of images correspondingly displayed by the display module in the main display space are frames of images from the M-th frame of image to the N-th frame of image, and the frames of images are continuous and include the M-th frame of image and the N-th frame of image. In a process in which the display module rotates from the first position to the second position in the same rotation direction (e.g., the clockwise direction), the display module will pass through the Q positions, and the Q positions include the first position and the second position; and when the display module is located at each of the Q positions, the display module displays a frame of image correspondingly. Therefore, the display module may correspondingly display the Q frames of images when passing through the Q positions, and the Q frames of images are continuous and are displayed by the display module in sequence. For example, in a case where K is 360, M is 21 and N is 300, the display module may pass through 360 positions during rotation for a round. For example, an angle difference between rotation angles of two adjacent positions is one degree. That is, the display module is at a new position each one degree of rotation. A position where the display module displays a 21st frame of image is a 21st position, which is the first position. A position where the display module displays a 300th frame of image is a 300th position, which is the second position. There are 280 positions from the 21st position to the 300th position, and the display module correspondingly displays 280 frames of images from the 21st frame of image to the 300th frame of image. That is, Q is 280, and the display module at each position corresponds to one frame of image.

For example, the second controller in the control apparatus transmits data of the Q frames of images to the display module, so that the display module sequentially displays the Q frames of images when rotating to the main display space, and the display module performs display in the second condition in the main display space. For example, the color depth of the displayed images is the second color depth. The Q frames of images are frames of images corresponding to the main display space in the K frames of images.

Assuming that a region occupied by m-th to n-th two-dimensional images in the sweep space is a main gaze region, the m-th to n-th two-dimensional images belong to the main gaze region.

For example, the first controller in the control apparatus may transmit information for characterizing the Q frames of images from the M-th frame of image to the N-th frame of image to the second controller. For example, the information for characterizing the Q frames of images from the M-th frame of image to the N-th frame of image includes: storage node information of each frame of image in the Q frames of images; or storage node information of the M-th frame of image and the N-th frame of image, and information for characterizing the range of the frames of images from the M-th frame of image to the N-th frame of image. In this way, the second controller may transmit the data of the Q frames of images from the M-th frame of image to the N-th frame of image to the display module, so that the display module sequentially displays the Q frames of images when in the main display space, and the display module performs display in the second condition in the main display space. For example, the refresh rate of the display module in the main display space is the second refresh rate.

It will be understood by those skilled in the art that the second controller in the control apparatus transmits data of the images to the driving chip(s) of the display module. The driving chip(s) drives the display panel(s) in the display module to display the images according to the data of the images, and the images displayed by the display panel(s) may be two-dimensional images.

Figure 11:
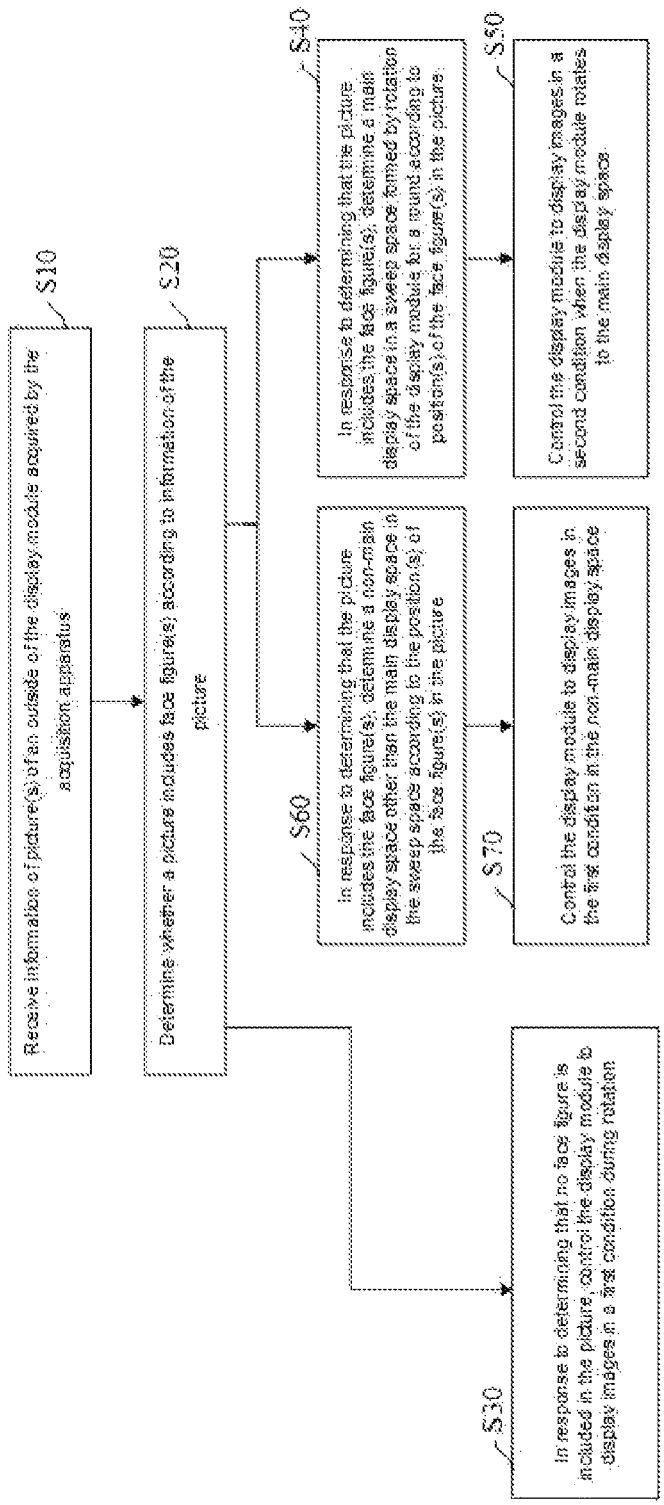
FIG. 11 is a flow diagram of another control method for a rotary display device, in accordance with some embodiments.

In some embodiments, referring to FIG. 11, the control method further includes following steps (S60 to S70).

In S60, in response to determining that the picture includes the face figure(s), a non-main display space other than the main display space in the sweep space is determined according to the position(s) of the face figure(s) in the picture. For example, the control apparatus 50 in FIGS. 1A and 1B may implement the S60. For example, the first controller 51 in the control apparatus 50 in FIGS. 1A and 1B may be used to perform the S60.

It will be noted that, if it is determined that the picture includes the face figure(s) in the S20, it is possible to determine both the main display space and the non-main display space according to the position(s) of the face figure(s) in the picture. In this way, the main display space and the non-main display space may be determined simultaneously. Therefore, in a process of determining the non-main display space in the S60, the main display space is also determined simultaneously. For the process of determining the main display space, reference may be made to the description of the corresponding description above, which will not be repeated here.

While the main display space is determined, the non-main display space may be determined, and the non-main display space is a space other than the main display space in the sweep space of the display module. For example, in the above process of determining the main display space, if the display module correspondingly displays the Q frames of images from the M-th frame of image to the N-th frame of image in the K frames of images at positions of the main display space in the sweep space, images displayed by the display module in the space other than the main display space in the sweep space correspond to frames of images other than the Q frames of images in the K frames of images.

In S70, the display module is controlled to display images in the first condition in the non-main display space. For example, the control apparatus 50 in FIGS. 1A and 1B may implement the S70. For example, the second controller 52 in the control apparatus 50 in FIGS. 1A and 1B may be used to perform the S70.

Figure 20:
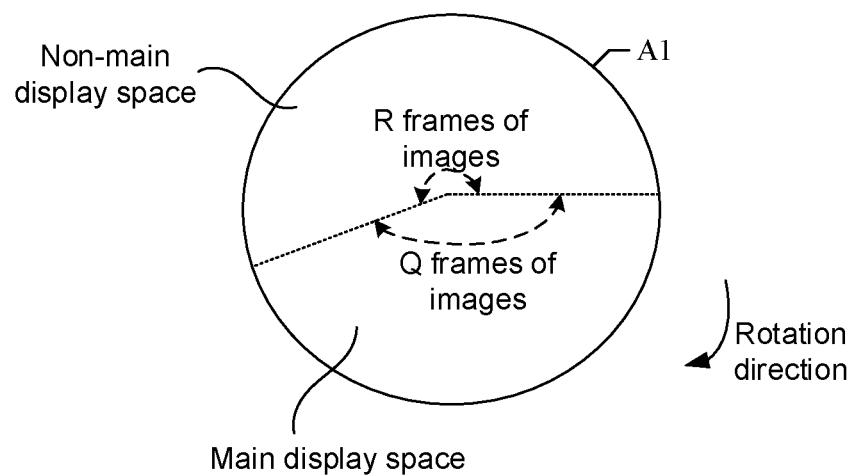
FIG. 20 is yet another process diagram of a control method for a rotary display device, in accordance with some embodiments.

For example, the display module displays K frames of images during the rotation for a round, and K is a positive integer. In the K frames of images, R frames of images correspond to the non-main display space, and R is a positive integer less than K. For example, if Q frames of images in the K frames of images correspond to the main display space (referring to FIG. 20), and R frames of images in the K frames of images correspond to the non-main display space (referring to FIG. 20), K is a sum of Q and R (Q+R=K). For example, during the rotation of the display module, if the Q frames of images from the M-th frame of image to the N-th frame of image are sequentially displayed in the main display space, the R frames of images from a H-th frame of image to an G-th frame of image may be sequentially displayed in the non-main display space in the rotation direction of the display module, where H is a sum of N and 1 (H=N+1), N is less than K (N<K), G is less than or equal to K (G K). In a case where the initial position is in the main display space, R is a sum of 1 and a difference of G and H (R=G−H+1).

It will be noted that, if the non-main display space includes the initial position, in a process in which the display module starts to rotate from the initial position, the display module is first in the non-main display space, then in the main display space and finally in the non-main display space. In this way, the display module may firstly display the first frame of image to the G-th frame of image in sequence in the non-main display space, and then display the H-th frame of image to the K-th frame of image in sequence in the non-main display space after passing through the main display space. If the non-main display space does not include the initial position, the main display space includes the initial position. That is, the M-th frame of image is the first frame of image. Based on this, a difference of M and 1 is 0, and a (M−1) frame of image may be understood as a last frame of image. That is, the display module is located at a previous position relative to the initial position; during the rotation of the display module for the round, the previous position relative to the initial position is the end position of the rotation for the round, and an image displayed by the display module at the end position is the K-th frame of image. In this way, in the process in which the display module starts to rotate from the initial position, the display module may display an H-th frame of image to a K-th frame of image in sequence in the non-main display space, and then display an H-th frame of image to a K-th frame of image in sequence again in the non-main display space after passing through the main display space.

For example, in the sweep space, a border of the non-main display space may be overlapped with the border of the main display space. Therefore, a first frame of image displayed by the display module in the main display space and a last frame of image displayed by the display module in the non-main display space are the same frame of image, and a last frame of image displayed by the display module in the main display space and a first frame of image displayed by the display module in the non-main display space are the same frame of image.

For example, the first controller in the control apparatus may send information for characterizing the R frames of images to the second controller. For example, the information for characterizing the R frames of images includes: storage node information of each frame of image in the R frames of images; or storage node information of a first frame of image and a last frame of image in the R frame of image, and information for characterizing a range of frames of images from the first frame of image to the last frame of image in the R frames of images. In this way, during the rotation of the display module, the R frames of images may be sequentially displayed in the non-main display space. For example, R may be 240. That is, the display module may display 240 frames of images in sequence when rotating in the non-main display space.

In this case, for example, controlling the display module to display images in the first condition in the non-main display space, includes: transmitting data of part of frames of images in the R frames of images to the display module, so that the display module sequentially displays the part of frames of images in the R frames of images in the non-main display space.

For example, during the rotation of the display module for the J-th round, data of part of frames of images in the R frames of images from the H-th frame of image to the G-th frame of image are transmitted to the display module. For example, if the R frames of images is 240 frames of images, data of 120 frames of images in the 240 frames of images are transmitted to the display module, so that during the rotation of the display module for the J-th round, the display module sequentially displays the part of frames of images in the R frames of images when rotating in the non-main display space. In this case, the display module performs display in the first condition in the non-main display space. For example, the refresh rate of the display module in the non-main display space is the first refresh rate, and the first refresh rate may be half of the second refresh rate; or the color depth of the displayed images is the first color depth.

In this case, by transmitting the data of the part of frames of images in the R frames of images to the display module, and not transmitting data of the other part of frames of images in the R frames of images to the display module, the amount of date of the images required to be processed by the display module during performing display is reduced. For example, two or more frames of images in the R frames of images may be merged to obtain the part of frames of images in the R frames of images. For example, two adjacent frames of images are merged according to a preset algorithm to obtain a new frame of image. For example, the 240 frames of images are converted into 120 frames of images through the preset algorithm, so that the display module displays the adjusted part of frames of images. In this way, it is possible to reduce the number of frames of images displayed by the display module during the rotation for a round, thereby reducing the amount of data of the images required to be processed by the display module during performing display.

For another example, controlling the display module to display images in the first condition in the non-main display space, includes: adjusting color depths corresponding to the R frames of images to the first color depth, and transmitting data of the adjusted R frames of images to the display module, so that the display module sequentially displays the adjusted R frames of images in the non-main display space, color depths of the displayed images being the first color depth.

For example, during the rotation of the display module for the J-th round, after adjusting the color depths corresponding to the R frames of images corresponding to the non-main display space to the first color depth, e.g., after reducing the color depths corresponding to the R frames of images from the second color depth to the first color depth, the data of the adjusted R frames of images are transmitted to the display module, so that images displayed by the display module in the non-main display space during the rotation for the J-th round are the adjusted R frames of images, the color depths of the displayed R frames of images are the first color depth, and the display module performs display in the first condition. In this way, it may be possible to reduce display requirements of the display module, thereby reducing the amount of data required to be processed by the control apparatus and reducing the work loss of the rotary display device.

For yet another example, controlling the display module to display images in the first condition in the non-main display space, includes: adjusting color depths corresponding to part of frames of images in the R frames of images to the first color depth, and transmitting data of the adjusted part of frames of images in the R frames of images to the display module, so that the display module sequentially displays the adjusted part of frames of images in the R frames of images in the non-main display space, the color depths of the displayed images being the first color depth.

For example, during the rotation of the display module for the J-th round, the color depths corresponding to the part of frames of images in the R frames of images are adjusted to the first color depth, e.g., the color depths corresponding to the part of frames of images in the R frames of images are reduced from the second color depth to the first color depth, and the data of the adjusted part of frames of images are transmitted to the display module. For example, color depths corresponding to the 120 frames of images in the 240 frames of images are adjusted to the first color depth, so that during the rotation of the display module for the J-th round, the display module displays the part frames of images in the R frames of images in the non-main display space, and color depths of the displayed images are the first color depth. In this case, the display module performs display in the first condition in the non-main display space. For example, the refresh rate of the display module is the first refresh rate, and the first refresh rate is half of the second refresh rate. In this way, not only may the amount of data required to be processed by the rotary display device during performing display be reduced, but also the power consumption of display may be reduced and the performance of the rotary display device may be improved.

It will be understood by those skilled in the art that the second controller in the control apparatus transmits data of the images to the driving chip(s) of the display module. The driving chip(s) drive display panel(s) in the display module to display the images according to the data of the images, and the images displayed by the display panel(s) may be two-dimensional images.

For example, referring to FIG. 13, there may be an overlapping region between regions that may be acquired by two cameras 41 in the acquisition apparatus 40. Therefore, there may also be an overlap between pictures acquired by the two cameras 41. For example, the pictures acquired by the two cameras are picture P and picture P'; a sub-region PA of the picture P and a sub-region PA' of the picture P' have an overlapping region, and positions of the overlapping region mapped to the peripheral border of the sweep space are the same. If the sub-region PA is completely or approximately completely overlapped with the sub-region PA', positions of the sub-region PA and the sub-region PA' mapped onto the peripheral border of the sweep space are the same. That is, the first position and the second position of the sub-region PA may respectively serve as a first position and a second position of the sub-region PA'. In this way, frames of images correspondingly displayed when the display module rotates from the first position of the sub-region PA to the second position thereof are the same as frames of images correspondingly displayed when the display module rotates from the first position of the sub-region PA' to the second position thereof.

It will be noted that, those skilled in the art may design the preset algorithm according to actual situations, and it will not be limited here. For example, it is possible to preset a color depth conversion formula, and when color depths corresponding to some frames of images needs to be adjusted, e.g., when the color depths need to be reduced from the second color depth to the first color depth, a value of the second color depth corresponding to the frames of images before adjustment may be substituted into the conversion formula, so as to obtain a value of the first color depth corresponding to the frames of images after adjustment. In addition, it is also possible to preset a plurality of color depth numerical intervals, and each color depth numerical interval corresponds to a value of the first color depth. When color depths corresponding to some frames of images need to be adjusted, a color depth numerical interval to which the value of the second color depth of the frames of images before adjustment belongs may be determined first, and then the value of the first color depth corresponding to the determined color depth numerical interval is used as the first color depth of the frames of images after adjustment.

For example, the above steps (S10 to S70) may be one execution cycle, and a frequency of performing these steps is related to a frequency at which the acquisition apparatus (e.g., camera(s) in the acquisition apparatus) acquires pictures of the outside of the display module. For example, the two frequencies may be equal.

For example, every time the display module rotates for one round, the acquisition apparatus (e.g., the camera(s) in the acquisition apparatus) may acquire picture(s) of the outside of the display module once. For example, during the rotation of the display module for the round, if the acquisition apparatus acquires the picture(s) of the outside of the display module once, a display status of the display module during rotation for a next round may be controlled through the steps (S10 to S70). For example, every time the display module rotates for at least two rounds, the acquisition apparatus acquires the picture(s) of the outside of the display module once. For example, during rotation of the display module from a V-th round to a (V+2)-th round, if the acquisition apparatus acquires the picture(s) of the outside of the display module once, a display status of the display module during rotation from a (V+3)-th round to a (V+5)-th round may be controlled through the steps (S10 to S70), and V is a positive integer. In addition, in sweep spaces of the display module during the rotation for the (V+3)-th round, the rotation for the (V+4)-th round and the rotation for the (V+5)-th round, corresponding ranges of main display spaces and corresponding ranges of non-main display spaces are the same, respectively.

Some embodiments of the present disclosure provide a non-transitory computer-readable storage medium. The computer readable storage medium has stored thereon computer program instructions that, when run on a processor, cause the processor to perform one or more steps in the control method as described in any of the above embodiments.

For example, the computer-readable storage medium may include, but is not limited to a magnetic storage device (e.g., a hard disk, a floppy disk or a magnetic tape), an optical disk (e.g., a compact disk (CD), a digital versatile disk (DVD)), a smart card and a flash memory device (e.g., an erasable programmable read-only memory (EPROM), a card, a stick or a key driver). Various computer-readable storage media described in the embodiments of the present disclosure may represent one or more devices and/or other machine-readable storage media for storing information. The term "machine-readable storage media" may include, but are not limited to, wireless channels and various other media capable of storing, containing and/or carrying instructions and/or data.

Some embodiments of the present disclosure provide a computer program product. The computer program product includes computer program instructions that, when executed on a computer, cause the computer to perform one or more steps in the control method as described in the above embodiments.

Some embodiments of the present disclosure provide a computer program. When the computer program is executed on the computer, the computer program causes the computer to perform one or more steps in the control method as described in the above embodiments.

The computer-readable storage medium, the computer program product and the computer program have the same beneficial effects as the control method as described in some embodiments, which will not be repeated here.

The forgoing descriptions are merely some implementations of the present disclosure. It will be noted that, a person of ordinary skill in the art may make certain improvements and modifications without departing from the principle of the present disclosure, which shall also be considered to be within the protection scope of the present disclosure.

What is claimed is:

1. A rotary display device, comprising:
   a display module;
   a rotating shaft coupled to a side face of the display module;
   a transmission apparatus coupled to the display module, the transmission apparatus being configured to drive the display module to rotate with an axial center line of the rotating shaft as an axis of rotation;
   an acquisition apparatus configured to acquire at least one picture of an outside of the display module; and
   a control apparatus coupled to the acquisition apparatus, the acquisition apparatus being further configured to send information of the at least one picture to the control apparatus, and the control apparatus being configured to: receive the information of the at least one picture sent by the acquisition apparatus and determine whether a picture includes at least one face figure according to information of the picture; in response to determining that no face figure is included in the picture, control the display module to display images in a first condition; and in response to determining that the picture includes the at least one face figure, determine a main display space in a sweep space formed by rotation of the display module for a round according to at least one position of the at least one face figure in the picture, and control the display module to display images in a second condition when the display module rotates to the main display space, wherein the first condition includes at least one of a first refresh rate and a first color depth, and the second condition includes at least one of a second refresh rate and a second color depth; the second refresh rate is greater than the first refresh rate, and the second color depth is greater than the first color depth.

2. The rotary display device according to claim 1, wherein the control apparatus includes:

a first controller coupled to the acquisition apparatus, the first controller being configured to: receive the information of the at least one picture sent by the acquisition apparatus and determine whether the picture includes the at least one face figure according to the information of the picture; and determine the main display space according to the at least one position of the at least one face figure in the picture in response to determining that the picture includes the at least one face figure; and a second controller coupled to the first controller and the display module, wherein the first controller is further configured to: send a first instruction to the second controller in response to determining that no face figure is included in the picture; and send a second instruction to the second controller in response to determining that the picture includes the at least one face figure, and the second controller is configured to: receive the first instruction and control, in response to the first instruction, the display module to display the images in the first condition; and receive the second instruction and control, in response to the second instruction, the display module to display the images in the second condition in the main display space.

3. The rotary display device according to claim 2, wherein the second controller is fixedly connected to the display module.

4. The rotary display device according to claim 3, further comprising a connecting plate, wherein the second controller and the display module are fixed to the connecting plate.

5. The rotary display device according to claim 2, wherein the rotating shaft and the transmission apparatus are respectively located on opposite sides of the display module in a direction of the axis of rotation of the display module;

the rotary display device further comprises a base; the base is located on a side of the transmission apparatus away from the display module in the direction of the axis of rotation of the display module; and the first controller is disposed on the base.

6. The rotary display device according to claim 2, wherein the first controller is further configured to determine a non-main display space other than the main display space in the sweep space according to the at least one position of the at least one face figure in the picture in response to determining that the picture includes the at least one face figure;

the first controller is further configured to send a third instruction to the second controller according to the determined non-main display space; and the second controller is further configured to control the display module to display the images in the first condition in the non-main display space according to the third instruction.

7. The rotary display device according to claim 5, wherein the acquisition apparatus includes at least one camera disposed on the base.

8. The rotary display device according to claim 1, wherein the display module includes a plurality of display panels tiled together.

9. The rotary display device according to claim 1, wherein the transmission apparatus includes:

an output shaft coupled to the display module; and a motor coupled to the output shaft, the motor being configured to drive the display module to rotate through the output shaft.

10. The rotary display device according to claim 9, further comprising:

a first power supply component coupled to the transmission apparatus, the first power supply component being configured to supply electric energy to the transmission apparatus; and at least one second power supply component coupled to the first power supply component and the control apparatus, wherein the first power supply component is further configured to supply electric energy to the at least one second power supply component; and each second power supply component is configured to transmit the electric energy from the first power supply component to the control apparatus.

11. The rotary display device according to claim 10, wherein a second power supply component includes:

a first conductive ring coupled to the first power supply component;

a second conductive ring coupled to the control apparatus, the first conductive ring and the second conductive ring being both sleeved on the output shaft, wherein the first conductive ring is in contact with the second conductive ring; or the first conductive ring is provided with a power transmitting coil therein, the second conductive ring is provided with a power receiving coil therein, and the first conductive ring and the second conductive ring are arranged at an interval in an axial direction of the output shaft.

12. A rotary display system, comprising:

the rotary display device according to claim 1; and an upper computer coupled to the rotary display device, the upper computer being configured to provide data of images to the rotary display device.

13. A control method for the rotary display device according to claim 1, the control method comprising:

receiving the information of the at least one picture of the outside of the display module acquired by the acquisition apparatus;

determining whether the picture includes the at least one face figure according to the information of the picture;

controlling the display module to display the images in the first condition during rotation in response to determining that no face figure is included in the picture;

determining the main display space in the sweep space formed by the rotation of the display module for the round according to the at least one position of the at least one face figure in the picture in response to determining that the picture includes the at least one face figure; and controlling the display module to display the images in the second condition when the display module rotates to the main display space, wherein the first condition includes at least one of the first refresh rate and the first color depth, and the second condition includes at least one of the second refresh rate and the second color depth; the second refresh rate is greater than the first refresh rate, and the second color depth is greater than the first color depth.

14. The control method according to claim 13, wherein determining the main display space in the sweep space formed by the rotation of the display module for the round according to the at least one position of the at least one face figure in the picture, includes:
    determining a sub-region to which the at least one face figure belong in the picture according to the at least one position of the at least one face figure in the picture;
    obtaining a first position and a second position of the sub-region mapped onto a peripheral border of the sweep space;
    obtaining a first rotation angle and a second rotation angle, wherein in a process in which the display module rotates for the round from an initial position, the first rotation angle is an included angle between the first position to which the display module rotates and the initial position, and the second rotation angle is an included angle between the second position to which the display module rotates and the initial position; and the second rotation angle is greater than the first rotation angle; and
    determining the main display space according to a space formed by rotation of the display module from the first rotation angle to the second rotation angle.

15. The control method according to claim 13, wherein determining the main display space in the sweep space formed by the rotation of the display module for the round according to the at least one position of the at least one face figure in the picture, includes:
    determining sub-regions to which face figures belong in the picture according to positions of the face figures in the picture;
    mapping each sub-region onto the peripheral border of the sweep space, so as to obtain a first position and a second position of each sub-region mapped onto the peripheral border of the sweep space, and to obtain a first rotation angle and a second rotation angle respectively corresponding to the first position and the second position of each sub-region; wherein in a process in which the display module rotates for the round from an initial position, the first rotation angle corresponding to the first position of each sub-region is an included angle between the first position of each sub-region to which the display module rotates and the initial position, and the second rotation angle corresponding to the second position of each sub-region is an included angle between the second position of each sub-region to which the display module rotates and the initial position; and the second rotation angle is greater than the first rotation angle; and
    determining the main display space according to a space formed by rotation of the display module from a smallest first rotation angle in first rotation angles to a largest second rotation angle in second rotation angles.

16. The control method according to claim 14, wherein the display module displays K frames of images during the rotation for the round, and K is a positive integer; and
    controlling the display module to display the images in the second condition when the display module rotates to the main display space, includes:
        obtaining an M-th frame of image displayed by the display module at the first position and an N-th frame of image displayed by the display module at the second position according to the first position and the second position, N being greater than M, M and N being both positive integers, and N being less than or equal to K; and
        transmitting data of Q frames of images from the M-th frame of image to the N-th frame of image to the display module to control the display module to display the Q frames of images in the second condition at Q positions corresponding to the main display space, Q being equal to a sum of 1 and a difference between N and M (Q=N−M+1).

17. The control method according to claim 13, wherein the display module displays K frames of images during the rotation for the round, and K is a positive integer; and
    controlling the display module to display the images in the first condition during the rotation in response to determining that no face figure is included in the picture, includes:
    transmitting data of part of frames of images in the K frames of images to the display module, so that the display module displays the part of frames of images in the K frames of images; or
    adjusting color depths corresponding to the K frames of images to the first color depth and transmitting data of the adjusted K frames of images to the display module, so that color depths of the images displayed by the display module are the first color depth; or
    adjusting color depths corresponding to part of frames of images in the K frames of images to the first color depth, and transmitting data of the adjusted part of frames of images in the K frames of images to the display module, so that the display module displays the adjusted part of frames of images in the K frames of images, the color depths of the displayed images being the first color depth.

18. The control method according to claim 13, further comprising:
    determining a non-main display space other than the main display space in the sweep space according to the at least one position of the at least one face figure in the picture in response to determining that the picture includes the at least one face figure; and
    controlling the display module to display images in the first condition in the non-main display space.

19. The control method according to claim 18, wherein the display module displays K frames of images during the rotation for the round, and K is a positive integer; R frames of images in the K frames of images correspond to the non-main display space, and R is a positive integer less than K; and
    controlling the display module to display the images in the first condition in the non-main display space, includes:
    transmitting data of part of frames of images in the R frames of images to the display module, so that the display module sequentially displays the part of frames of images in the R frames of images in the non-main display space; or
    adjusting color depths corresponding to the R frames of images to the first color depth, and transmitting data of the adjusted R frames of images to the display module, so that the display module sequentially displays the adjusted R frames of images in the non-main display space, color depths of the displayed images being the first color depth; or
    adjusting color depths corresponding to part of frames of images in the R frames of images to the first color depth, and transmitting data of the adjusted part of frames of images in the R frames of images to the display module, so that the display module sequentially displays the adjusted part of frames of images in the R frames of images in the non-main display space, the color depths of the displayed images being the first color depth.

20. A non-transitory computer-readable storage medium having stored thereon computer program instructions that, when run on a processor, cause the processor to perform one or more steps of the control method for the rotary display device according to claim 13.

* * * * *